US012425258B2

(12) United States Patent
Vu et al.

(10) Patent No.: US 12,425,258 B2
(45) Date of Patent: Sep. 23, 2025

(54) METHOD AND APPARATUS FOR PROVIDING GROUP CALL SERVICE

(71) Applicant: Samsung Electronics Co., Ltd., Suwon-si (KR)

(72) Inventors: Van Nam Vu, Yen Phong (VN); Van Khanh Nguyen, Yen Phong (VN); Thi Thuy Van Do, Yen Phong (VN); Tuan Dung Lai, Yen Phong (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 18/417,337

(22) Filed: Jan. 19, 2024

(65) Prior Publication Data

US 2024/0250839 A1    Jul. 25, 2024

(30) Foreign Application Priority Data

Jan. 20, 2023   (KR) .................. 10-2023-0008970
Jan. 30, 2023   (KR) .................. 10-2023-0011901

(51) Int. Cl.
  *H04L 12/18*   (2006.01)
  *G06V 40/16*   (2022.01)
(52) U.S. Cl.
  CPC ........ *H04L 12/1822* (2013.01); *G06V 40/171* (2022.01)
(58) Field of Classification Search
  None
  See application file for complete search history.

(56) References Cited

U.S. PATENT DOCUMENTS 9,098,584 B1 *   8/2015   Fredinburg ........... G06F 16/951
9,256,620 B2 *   2/2016   Amacker ................ G06F 16/51
(Continued)

FOREIGN PATENT DOCUMENTS

KR          10-0783553 B1    12/2007
KR     10-2011-0136078 A     12/2011
(Continued)

OTHER PUBLICATIONS

Campadelli et al.; A feature-based face recognition system; Dipartimento di Scienze dell'Informazione Universita degli Studi di Milano Via Comelico, 39/41 20135 Milano, Italy, Oct. 2003.
(Continued)

*Primary Examiner* — Phyllis A Book
(74) *Attorney, Agent, or Firm* — Jefferson IP Law, LLP

(57) ABSTRACT

A first electronic device and a method for providing a group call service are provided. The method includes receiving a user input for a group call between multiple people included in a designated image, acquiring facial features of the multiple people, acquiring, based on the facial features, first contact information of a first person from a first local contact list stored in the first electronic device, transmitting the first contact information of the first person and a facial feature of a second person to a server, receiving an identification value of the first person holding second contact information of the second person from the server, initiating, based on the first contact information, the group call of the first person with respect to a second electronic device, and transmitting a request for participation of a third electronic device in the group call to the second electronic device.

20 Claims, 15 Drawing Sheets

(56) References Cited

U.S. PATENT DOCUMENTS

| | | | |
|---|---|---|---|
| 10,498,881 B2 | 12/2019 | Shin | |
| 10,564,824 B1* | 2/2020 | Freeman | G06V 40/172 |
| 2008/0176602 A1 | 7/2008 | Kim | |
| 2009/0023472 A1* | 1/2009 | Yoo | H04M 1/576 |
| | | | 455/415 |
| 2013/0053002 A1* | 2/2013 | Hymes | H04W 4/20 |
| | | | 455/414.1 |
| 2014/0011487 A1 | 1/2014 | Hwang et al. | |
| 2014/0055553 A1* | 2/2014 | Lee | G06V 10/95 |
| | | | 348/14.07 |
| 2015/0085146 A1 | 3/2015 | Khemkar | |
| 2016/0037129 A1* | 2/2016 | Tangeland | G06V 40/16 |
| | | | 348/14.09 |
| 2017/0332045 A1* | 11/2017 | Metter | G06T 13/40 |
| 2018/0007204 A1* | 1/2018 | Klein | H04M 3/5166 |
| 2018/0232562 A1* | 8/2018 | Cambor | G06V 40/172 |
| 2020/0358983 A1* | 11/2020 | Astarabadi | H04N 7/157 |
| 2021/0409234 A1* | 12/2021 | Behar | H04L 65/403 |
| 2022/0035897 A1* | 2/2022 | Agrawal | G06V 40/172 |
| 2022/0236846 A1* | 7/2022 | Leung | G06F 3/0488 |
| 2022/0247973 A1* | 8/2022 | Astarabadi | G06V 10/82 |
| 2023/0008561 A1* | 1/2023 | Stevens | G16H 80/00 |
| 2023/0412553 A1* | 12/2023 | Boyd | H04L 63/102 |
| 2024/0103793 A1* | 3/2024 | Tennøe | H04L 12/1822 |

FOREIGN PATENT DOCUMENTS

| | | | | |
|---|---|---|---|---|
| KR | 10-2013-0137283 A | | 12/2013 | |
| WO | WO-2016185229 A1 * | | 11/2016 | G06F 7/08 |

OTHER PUBLICATIONS

Bhattacharyya; Hybrid features based face recognition method using Artificial Neural Network; ResearchGate; Mar. 2012.

Manjunath et al.; A Feature Based Approach to Face Recognition; IEEE; 1992.

Refaces Blog; Understanding facial recognition algorithms; https://recfaces.com/articles/facial-recognition-algorithms, Mar. 25, 2021.

Kapersky Total Security; What is Facial Recognition—Definition and Explanation; https://www.kaspersky.com/resource-center/definitions/what-is-facial-recognition, Dec. 2, 2020.

* cited by examiner

METHOD AND APPARATUS FOR PROVIDING GROUP CALL SERVICE

CROSS-REFERENCE TO RELATED APPLICATION(S)

This application is based on and claims priority under 35 U.S.C. § 119(a) of a Korean patent application number 10-2023-0008970, filed on Jan. 20, 2023, in the Korean Intellectual Property office, and of a Korean patent application number 10-2023-0011901, filed on Jan. 30, 2023, in the Korean Intellectual Property Office, the disclosure of each of which is incorporated by reference herein in its entirety.

BACKGROUND

1. Field

The disclosure relates to an electronic device for providing a group call service and an operation method of the electronic device.

2. Description of Related Art

An electronic device may provide a group call service for multiple people. Multiple people may be selected to perform the group call service for the multiple people. The electronic device may store a contact list in a server or a memory of the electronic device.

The electronic device may receive a user input for selecting multiple people to participate in a group call. The electronic device may provide the group call service to the multiple people selected based on the user input. Multiple applications running on the electronic device may be used together to perform one function. The electronic device may perform a function thereof by using a database configured for the server. The electronic device may map at least one image and at least one contact detail, and store the same in the memory.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for providing a group call service and an operation method of the electronic device.

Additional aspects will be set forth in part in the description which follows and, in part, will be apparent from the description, or may be learned by practice of the presented embodiments.

In accordance with an aspect of the disclosure, a method for providing a group call service by a first electronic device is provided. The method includes receiving a user input for a group call between multiple people included in a designated image, acquiring facial features of the multiple people in the image in response to the user input, acquiring, based on the facial features, first contact information of a first person among the multiple people from a first local contact list stored in the first electronic device, transmitting the first contact information of the first person and a facial feature of a second person among the multiple people to a server, receiving an identification value of the first person holding second contact information of the second person from the server, initiating, based on the first contact information, the group call of the first person with respect to a second electronic device, and transmitting a request for participation of a third electronic device in the group call to the second electronic device, wherein the first person holding the second contact information of the second person is identified by the server by comparing the facial feature of the second person with multiple cloud contact lists stored in the server.

In accordance with another aspect of the disclosure, a first electronic device for providing a group call service is provided. The first electronic device includes at least one communication circuit configured to access a server configured to configure a cloud contact database including multiple cloud contact lists, a display, one or more processors, and memory storing a first local contact list and one or more programs including instructions that, when executed by the one or more processors, cause the first electronic device to receive a user input for a group call between multiple people included in a designated image, acquire facial features of the multiple people in the image in response to the user input, acquire, based on the facial features, first contact information of a first person among the multiple people from a first local contact list stored in the first electronic device, transmit the first contact information of the first person and a facial feature of a second person among the multiple people to the server, the first local contact list including no second contact information of the second person, receive an identification value of the first person holding second contact information of the second person from the server, initiate, based on the first contact information, the group call of the first person with respect to a second electronic device, and transmit a request for participation of a third electronic device in the group call to the second electronic device, wherein the first person holding the second contact information of the second person is identified by the server by comparing the facial feature of the second person with multiple cloud contact lists stored in the server.

In accordance with yet another aspect of the disclosure, one or more non-transitory computer-readable storage media storing one or more computer programs including instructions that, when executed by one or more processors of a first electronic device, cause the first electronic device to perform operations are provided. The operations include receiving a user input for a group call between a plurality of people included in a designated image displayed on a screen of the first electronic device, in response to the user input, acquiring facial features of the plurality of people in the designated image, based on the facial features, acquiring first contact information of a first person among the plurality of people from a first local contact list stored in the first electronic device, transmitting the first contact information of the first person and a facial feature of a second person among the plurality of people to a server, wherein second contact information of the second person is not included in the first local contact list, receiving, from the server, information indicating that the first person has the second contact information of the second person, in response to the receiving of the information indicating that the first person has the second contact information of the second person, initiating the group call with a second electronic device of the first person by using the first contact information, transmitting, to the second electronic device, a request for participation of a third electronic device in the group call, wherein the first person having the second contact information of the second person is identified by the server by comparing the facial feature of the second person with a plurality of cloud contact lists stored in the server.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
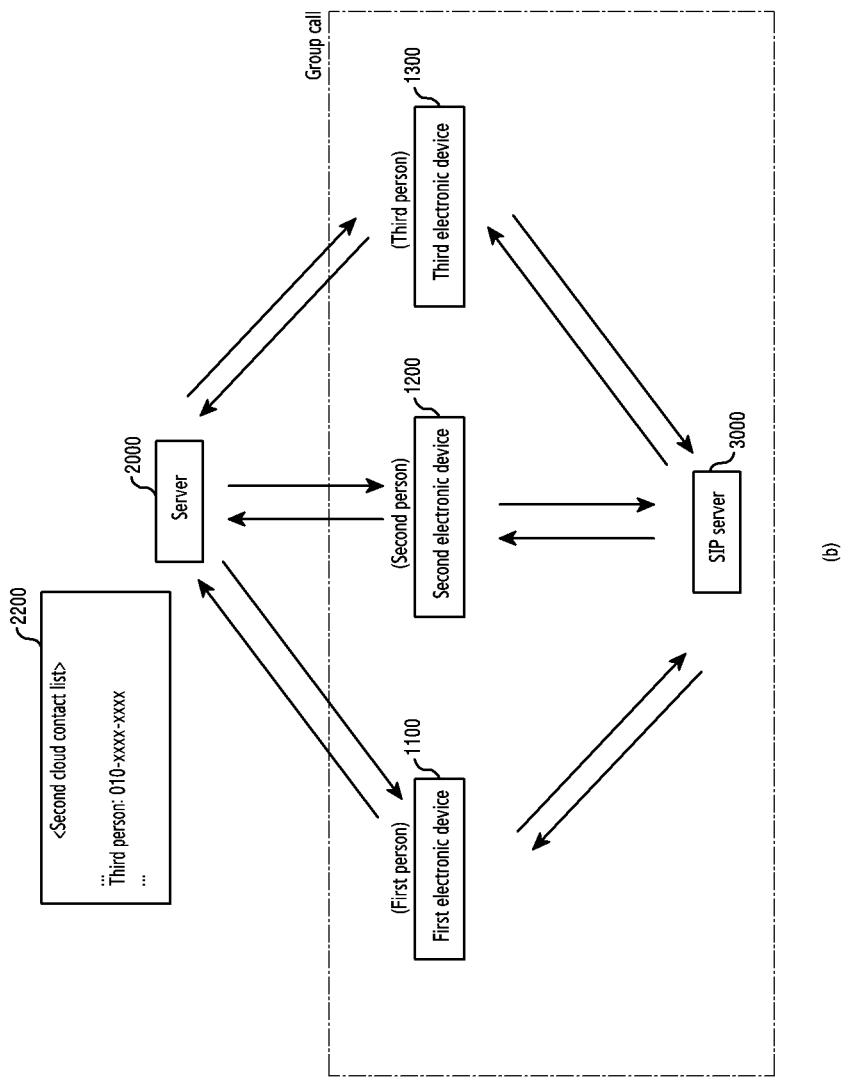
FIG. 1 is a schematic diagram of a system for providing a group call service according to an embodiment of the disclosure.
Figure 1:
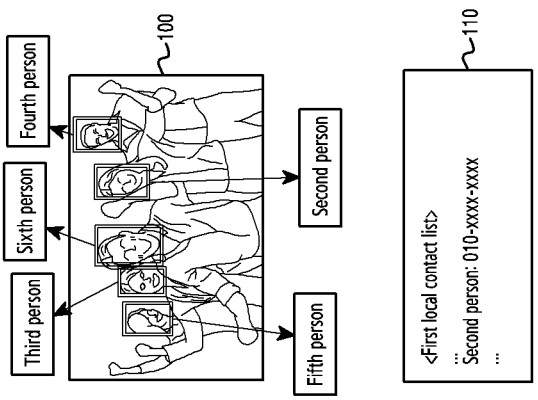

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit the disclosure. In addition, descriptions of well-known functions and constructions may be omitted for clarity and conciseness.

Terms and words used in the following description and claims are not limited to the bibliographical meanings, but, are merely used by the inventor to enable a clear and consistent understanding of the disclosure. Accordingly, is should be apparent to those skilled in the art that the following description of various embodiments of the disclosure is provided for illustration purpose only and not for the purpose of limiting of the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, terms, such as first and second, may be used to describe various elements, but the elements should not be limited by these terms. These terms are used for the purpose of distinguishing one element from another.

Throughout the specification, when a part is said to be "connected" to another part, this includes not only a case of being "directly connected," but also a case of being "electrically connected" with another element in between. In addition, when a part is said to "include" an element, this indicates that the element may further be included rather than excluding other elements, unless specifically stated to the contrary.

The wordings, such as "in an embodiment", appearing in various places in the disclosure do not necessarily all refer to the same embodiment.

An embodiment of the disclosure may be represented by functional block configurations and various processing operations. Some or all of such functional blocks may be implemented in various numbers of hardware and/or software elements configured to perform specific functions. For example, the functional blocks of the disclosure may be implemented by one or more microprocessors, or may be implemented by circuit configurations for predetermined functions. In addition, for example, the functional blocks of the disclosure may be implemented in various programming or scripting languages. The functional blocks may be implemented via algorithms executed by one or more processors. In addition, the disclosure may adopt conventional technologies for electronic environment configuration, signal processing, and/or data processing. The terms, such as "mechanism," "element," "means," and "configuration" may be used widely, and are not limited to mechanical and physical elements.

In addition, connection lines or connection members between elements illustrated in the drawings merely exemplify functional connections and/or physical or logical connections. In a practical device, connections between elements may be represented by various replaceable or additional functional connections, physical connections, or logical connections.

Hereinafter, the disclosure will be described in detail with reference to the accompanying drawings.

A method for providing a group call service by a first electronic device according to an embodiment of the disclosure may include: receiving a user input for a group call between multiple people included in a designated image displayed on a screen of the first electronic device; acquiring facial features of the multiple people in the image in response to the user input; based on the facial features, acquiring first contact information of a first person among the multiple people from a first local contact list stored in the first electronic device; transmitting the first contact information of the first person and a facial feature of a second person among the multiple people to a server, wherein second contact information of the second person is not included in the first local contact list; receiving, from the server, information indicating that the first person holds (or has) the second contact information of the second person; in response to the receiving of the information indicating that the first person holds the second contact information of the second person, initiating the group call of the first person with respect to a second electronic device by using the first contact information; and transmitting a request for participation of a third electronic device in the group call to the second electronic device, wherein the first person holding the second contact information of the second person is identified by the server by comparing the facial feature of the second person with multiple cloud contact lists stored in the server.

Accordingly, a system for providing a group call service may even if the first electronic device of the first person stores only the second contact information of the second person included in the designated image without storing third contact information of a third person, enable the first electronic device, the second electronic device, and the third electronic device to perform the group call by using the third contact information of the third person, which is held by the second person.

In addition, in order to perform the group call, retrieving contact information for multiple people included in the designated image may be simplified.

In addition, the acquiring of the first contact information may include acquiring the first contact information by comparing the facial features with person images in the first local contact list.

In addition, the transmitting of the first contact information and the facial feature of the second person to the server may include requesting, from the server, an identification value of a person holding the second contact information among the multiple people.

In addition, the receiving of the information indicating that the first person holds the second contact information of the second person may include receiving an identification value of the first person from the server.

In addition, the transmitting of the request for participation of the third electronic device in the group call to the second electronic device may further include transmitting the request for the participation to the second electronic device so that an indicator, which indicates that initiation of the group call or invitation to the group call is performed by a user of the first electronic device or a user of the second electronic device, is displayed on a display of the third electronic device.

In addition, the first person holding the second contact information of the second person may be identified by the server by comparing the facial feature of the second person with a first cloud contact list of the first person among the multiple cloud contact lists stored in the server.

In addition, the acquiring of the facial features of the multiple people in the image may include, based on a user selection of selecting at least some people from among the multiple people in the image, acquiring facial features of the at least some people in the image.

Accordingly, the first electronic device may request the group call only for the at least some people selected from among the multiple people in the image, and may not request the group call for a person not selected from among the multiple people in the image.

In addition, the method may further include: transmitting a facial feature of a third person among the multiple people to the server; based on third contact information of the third person being stored in a first cloud contact list, receiving the third contact information of the third person from the server; and based on the third contact information, inviting the third person to the group call.

In addition, the method may further include: requesting, via the server, the third electronic device to share the second contact information of the third electronic device with the first electronic device; receiving the second contact information of the third electronic device from the server; and storing the second contact information and the facial feature of the second person in the first local contact list.

In addition, the method may further include: based on the facial features of the multiple people in the image, distinguishing partial images related to the multiple people in the image, and while the group call is in progress, displaying, on a display of the first electronic device, at least some of the images showing faces of participants of the group call; mapping objects on the at least some of the images and displaying the same; and displaying, via the objects, indicators indicating that corresponding contact information is stored in the first electronic device, that the group call is being requested, that the group call is being connected, or that speech is being produced.

A first electronic device for providing a group call service according to an embodiment of the disclosure may include: at least one communication circuit configured to communicate with a server configured to store multiple cloud contact lists; a display; a memory configured to store a first local contact list and instructions; and at least one processor operatively connected to the memory. The at least one processor, by executing the instructions, may be configured to: receive a user input for a group call between multiple people included in a designated image displayed on the display; acquire facial features of the multiple people in the image in response to the user input; based on the facial features, acquire first contact information of a first person among the multiple people from the first local contact list stored in the first electronic device; transmit the first contact information of the first person and a facial feature of a second person among the multiple people to the server, wherein second contact information of the second person is not included in the first local contact list; receive an identification value of the first person holding the second contact information of the second person from the server; based on the first contact information, initiate the group call of the first person with respect to a second electronic device; and transmit a request for participation of a third electronic device in the group call to the second electronic device. The first person holding the second contact information of the second person may be identified by the server by comparing the facial feature of the second person with the multiple cloud contact lists stored in the server.

In addition, the at least one processor may be configured to acquire the first contact information by comparing the facial features with person images in the first local contact list.

In addition, the at least one processor may be configured to transmit the first contact information and the facial feature of the second person to the server, thereby requesting, from the server, an identification value of a person holding the second contact information among the multiple people.

In addition, the at least one processor may be configured to receive, from the server, information indicating that the first person holds the second contact information, thereby receiving the identification value of the first person from the server.

In addition, the at least one processor may be further configured to, when transmitting the request for participation of the third electronic device in the group call to the second electronic device, provide an indication to display an indicator, which indicates that initiation of the group call or invitation to the group call is performed by a user of the first electronic device or a user of the second electronic device, on a display of the third electronic device.

In addition, the first person holding the second contact information of the second person may be identified by the server by comparing the facial feature of the second person with a first cloud contact list of the first person among the multiple cloud contact lists stored in the server.

In addition, the at least one processor may be further configured to, based on a user selection of selecting at least some people from among the multiple people in the image, acquire facial features of the at least some people in the image.

In addition, the at least one processor may be further configured to transmit a facial feature of a third person among the multiple people to the server, receive, based on third contact information of the third person being stored in a first cloud contact list, the third contact information of the third person from the server, and based on the third contact information, invite the third person to the group call.

In addition, the at least one processor may be further configured to request, via the server, the third electronic device to share the second contact information of the third electronic device with the first electronic device, receive the second contact information of the third electronic device from the server, and store the second contact information and the facial feature of the second person in the first local contact list.

In addition, the at least one processor may be further configured to, based on the facial features of the multiple people in the image, distinguish partial images related to the multiple people in the image, and while the group call is in progress, display, on the display of the first electronic device, at least some of the images showing faces of participants of the group call; map objects on the at least some of the images and display the same; and display indicators on some of the objects. The indicators may indicate that corresponding contact information is stored in the first electronic device, that the group call is being requested, that the group call is being connected, or that speech is being produced.

According to an embodiment of the disclosure, a method for providing a group call service by a server is described. The method may include: receiving a designated image from a first electronic device; acquiring facial features of multiple people included in the image; transmitting the facial features to the first electronic device; acquiring first contact information of a first person among the multiple people from the first electronic device; in response to the acquiring of the first contact information of the first person, selecting a first cloud contact list, which the first person has stored in the server, from among multiple cloud contact lists stored in the server; acquiring second contact information of a second person from the first cloud contact list, wherein the second contact information of the second person is not included in a first local contact list; and based on the acquiring of the second contact information of the second person from the first cloud contact list, causing the first person to transmit, to the second electronic device, a request for participation of a third electronic device in the group call.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1 is a schematic diagram of a system for providing a group call service according to an embodiment of the disclosure.

The system for providing the group call service according to an embodiment may include a first electronic device 1100, a second electronic device 1200, a third electronic device 1300, and a server 2000. The system for providing the group call service may enable electronic devices of multiple people appearing in a designated image 100 of the first electronic device 1100 to perform a group call with each other. For example, the system for providing the group call service may even if the first electronic device 1100 of a first person stores only second contact information of a second person included in the designated image 100 without storing third contact information of a third person, enable the first electronic device 1100, the second electronic device 1200, and the third electronic device 1300 to perform a group call by using the third contact information of the third person, which is held by the second person.

The designated image according to an embodiment may be a person image displayed on a screen of the first electronic device 1100. A person image may be a photographic image in which at least one person is expressed. A facial image according to an embodiment may be an image of a face part in a person image. For example, in FIG. 1, the image 100 may be a person image in which five people are expressed. The image 100 may include five facial images for five people in FIG. 1.

In the document, person information may include information stored in a contact list, for example, the person information may include contact information such as a phone number, a name, at least one facial image, at least one email address, at least one account ID, and at least one wearable device ID. For example, in FIG. 1, a first local contact list 110 may include person information of the second person. The person information of the second person stored in the first local contact list 110 may include a name, a phone number, and at least one facial image of the second person.

Contact information in the document may include a phone number. For example, in FIG. 1, second contact information may be the second person's phone number (e.g., 010-xxxx-xxxx), and third contact information may be the third person's phone number.

At least one phone number may be stored in the contact list according to an embodiment. A phone number may be grouped with at least one of a name of a person associated with the phone number, a facial image of the person, an email address of the person, an account ID of the person, a wearable device ID of the person, or a phone number of another device of the person, so as to be stored in the contact list.

The contact list according to an embodiment may be a local contact list stored in the electronic device, or a cloud contact list stored in the server 2000.

The electronic device according to an embodiment may store the local contact list in a memory. For example, the first electronic device 1100 may store the first local contact list 110 in the memory. The first electronic device 1100 may request a call from another external electronic device, based on information stored in the first local contact list 110. Referring to part (a) of FIG. 1, the first local contact list 110 of the first electronic device 1100 may include the second person's phone number. The second person's phone number may be grouped with a facial image of the second person so as to be stored in the first local contact list 110.

The server 2000 according to an embodiment may include a cloud contact database. The cloud contact database may include multiple cloud contact lists. For example, referring to FIG. 1, a second cloud contact list 2200 may be stored in the server 2000. In FIG. 1, the second cloud contact list 2200 may include the third person's phone number. The third person's phone number may be grouped with a facial image of the third person so as to be stored in the second cloud contact list 2200.

In a network environment, the first electronic device 1100 may communicate with a session initiation protocol (SIP) server 3000 or the server 2000, which communicates with the second electronic device 1200 or the third electronic device 1300. In the network environment, the first electronic device 1100 may perform the group call with multiple other external electronic devices. The first electronic device 1100 may communicate with the server 2000 or the SIP server 3000 to perform various other functions related to the group call.

The first electronic device 1100 may request the group call from at least some of the multiple people appearing in the image 100. For example, the first electronic device 1100 may request the group call from the second to sixth people appearing in the image 100. For example, the first electronic device 1100 may store, in the first local contact list 110, person information of the second person and sixth person among at least some people. For example, the person information of the second person stored in the first local contact list 110 may include the second person's phone number (i.e., the second contact information) and the facial image of the second person. The person information of the sixth person stored in the first local contact list 110 may include sixth contact information and a facial image of the sixth person. The first local contact list 110 of the first electronic device 1100 may not include person information of the third to fifth people.

The first electronic device 1100 may designate the image 100 and receive a user input for the group call between the multiple people included in the image 100.

The cloud contact database including the multiple cloud contact lists may be configured in the server 2000 according to an embodiment. Each cloud contact list included in the cloud contact database may include at least one of an account ID, contact information including a phone number, a facial image (e.g., a facial image extracted from a profile image or a person image), an e-mail address, an SNS account, or a wearable device ID.

Each cloud contact list according to an embodiment may include contact information (e.g., a phone number) for at least one person among the multiple people included in the designated image. For example, for the third person included in the image 100, the second cloud contact list 2200 may include the third person's third contact information (e.g., the third person's phone number).

Each of the multiple people may be a user of a different electronic device. For example, the first person may be a user of the first electronic device 1100.

Referring to part (b) of FIG. 1, the second cloud contact list 2200 may be stored in the server 2000 by the second person in relation to the second electronic device 1200.

Accordingly, even if the first electronic device 1100 stores only the second contact information of the second person included in the designated image without storing the third contact information of the third person, the first electronic device 1100 may perform the group call with the second electronic device 1200 and the third electronic device 1300 by using the third person's third contact information held by the second person, which is stored in the server 2000.

Figure 2:
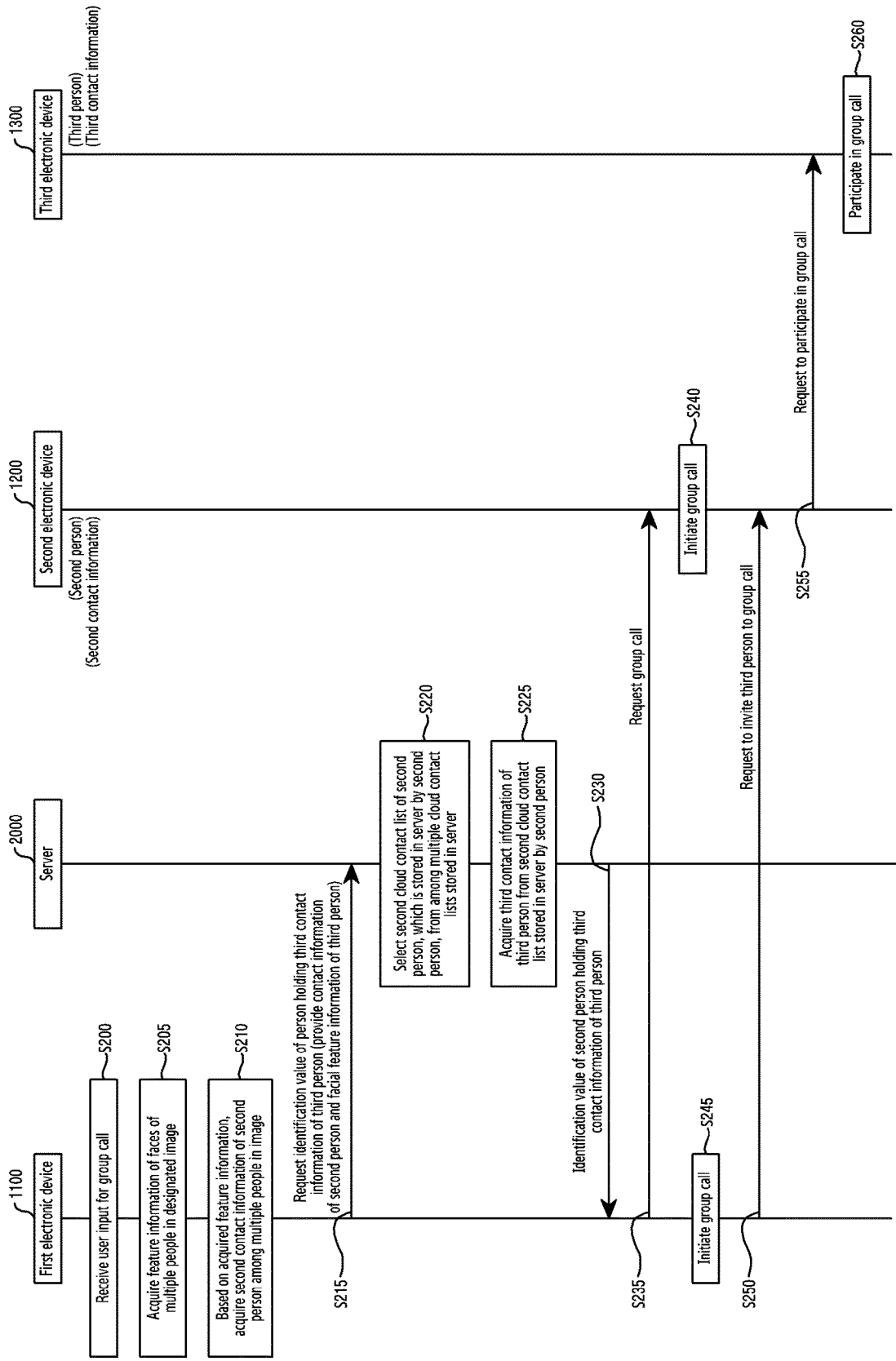
FIG. 2 is a flowchart of a method for performing a group call between a first electronic device, a second electronic device, and a third electronic device according to an embodiment of the disclosure.

FIG. 2 is a flowchart of a method for performing a group call between the first electronic device 1100, the second electronic device 1200, and the third electronic device 1300 according to an embodiment of the disclosure.

In operation S200, the first electronic device 1100 may receive a user input for a group call. The first electronic device 1100 according to an embodiment may receive a user input for a group call between multiple people included in a designated image (e.g., the image 100 of FIG. 1).

For example, the user input for the group call is pressing an input button for the group call while the designated image 100 including multiple people is displayed on a display screen of the first electronic device 1100, but may include selecting of an object. For example, the user input for the group call may include an input of selecting one image 100 including multiple people from among multiple images stored in the first electronic device 1100. In addition, the user input for the group call may include selecting one image 100 including multiple people from among multiple images stored in the electronic device, and selecting at least some people from among the multiple people included in the selected image 100. The first electronic device 1100 may receive a user input of selecting at least some of the multiple people included in the designated image 100 and provide the group call for the at least some people.

In operation S205, the first electronic device 1100 may acquire feature information of the multiple people's faces in the image 100. Feature information of a face according to an embodiment may include feature points (e.g., eyes, a nose, a mouth, and a face shape) relating to elements constituting the face and information on distribution of feature points. For example, the first electronic device 1100 may acquire facial feature information of the second person from an image including the second person. For example, the first electronic device 1100 may acquire feature information of the second person's face and of the third person's face from images including the second and third people.

When feature information of the multiple people's faces is acquired according to an embodiment, a facial recognition technology may be used.

The first electronic device 1100 according to an embodiment may acquire, based on selection of at least some people from among the multiple people included in the image 100, feature information on faces of the at least some people.

In operation S210, the first electronic device 1100 may acquire second contact information of the second person included in the designated image 100, based on acquired facial feature information of the second person. Operation S210 is described in detail in FIG. 3.

Even if the first electronic device 1100 according to an embodiment cannot acquire, from the first local contact list 110, contact information on some of the multiple people included in the designated image 100, the first electronic device 1100 may perform the group call for all of the multiple people by communicating with the server 2000. To this end, as shown in operation S215 to operation S260, the first electronic device 1100 may use person information of at least one person, which is acquired from the first local contact list 110, so as to request the group call even from people who cannot be acquired from the first local contact list 110, and perform the group call.

For example, in operation S215, the first electronic device 1100 may request, from the server 2000, an identification value of a person holding third contact information of the third person included in the designated image 100. The first electronic device 1100 may provide the server 2000 with the second contact information of the second person and the facial feature information of the third person. In order to perform the group call using the third person's third contact information held by the second person, the first electronic device 1100 may provide the server 2000 with the second contact information of the second person and the facial feature information of the third person.

For example, even if the second contact information of the second person is stored in the first local contact list 110 and the third contact information of the third person is not stored in the first local contact list 110, the first electronic device 1100 may identify, via the server 2000, the second person holding the third contact information so as to, as a result, perform the group call in which the third person participates.

Operation S220 and operation S225 may be performed by the server 2000. Operation S220 is an operation of selecting second cloud contact list (e.g., the second cloud contact list 2200 of FIG. 1) of the second person, which is stored in the server 2000 by the second person, from among multiple cloud contact lists stored in the server 2000.

A cloud contact database is configured in the server 2000 according to an embodiment, and the cloud contact database may include multiple cloud contact lists. The second cloud contact list 2200 according to an embodiment may be stored in the server 2000 by the second person. The second cloud contact list 2200 may include several people's contact information held by the second person. For example, the second cloud contact list 2200 may include the third contact information of the third person, which the first person does not have, and in operation S220, the server 2000 may select the second cloud contact list 2200 including the third contact information of the third person.

The server 2000 may acquire the second contact information of the second person from the first electronic device 1100 in operation S215, and may select the second cloud contact list 2200 corresponding to the second contact information of the second person in operation S220. The server 2000 may select the second cloud contact list of the second person, based on the second person's second contact information received from the first electronic device 1100.

Operation S225 is an operation in which the server 2000 acquires the third contact information of the third person from the second cloud contact list 2200 stored in the server 2000 by the second person. The server 2000 according to an embodiment may in order to respond to the identification value request of the first electronic device 1100 in operation S215, acquire the third contact information of the third person from the second cloud contact list in operation S225. The server 2000 may acquire the third contact information of the third person from the second cloud contact list by using the facial feature information of the third person.

Operation S220 and operation S225 will be described in detail in FIG. 4.

In operation S230, the server 2000 may provide the first electronic device 1100 with an identification value of the second person holding the third contact information of the third person. The first electronic device 1100 may receive the identification value of the second person holding the third contact information of the third person from the server 2000.

The server 2000 may provide the first electronic device 1100 with information indicating that the second person holds the third contact information of the third person. Based on acquiring of the third contact information from the second cloud contact list 2200, the server 2000 may provide the first electronic device 1100 with an identification value (in FIG. 2, "the identification value of the second person") associated with the second cloud contact list 2200 including the third contact information. Alternatively, based on inability to acquire the third contact information from the second cloud contact list 220, the server 2000 may not provide the first electronic device 1100 with the identification value associated with the second cloud contact list 2200.

Although the second contact information of the second person acquired in operation S210 is provided to the server 2000, if the identification value of the person holding the third contact information of the third person cannot be received from the server 2000, the first electronic device 1100 may request the third contact information of the third person from the server 2000 again by using contact information on at least one other person acquired from the designated image.

Operation S235 is an operation in which the first electronic device 1100 requests the group call from the second electronic device 1200. The first electronic device 1100 according to an embodiment may request the group call from an external electronic device, based on the identification value received from the server 2000. For example, based on reception of the identification value of the second person in operation S230, the first electronic device 1100 may request the group call from the second electronic device 1200 of the second person in operation S235. The first electronic device 1100 may request the group call from the second electronic device 1200 via the server 2000 or the SIP server 3000.

Operation S240 is an operation in which the second electronic device 1200 initiates the group call with respect to the first electronic device 1100. Operation S240 of the second electronic device 1200 may include at least one of receiving a user input for accepting the group call request of the first electronic device 1100 and receiving a user input for initiating the call with respect to the first electronic device. In operation S240, the second electronic device 1200 may receive the user input for initiating the group call.

When operation 245 is performed, the first electronic device 1100 may initiate the group call with respect to the second electronic device 1200.

Operation S250 is an operation in which the first electronic device 1100 requests the second electronic device 1200 to invite the third electronic device 1300 to the group call. Operation S250 may be performed by the first electronic device 1100 as shown in FIG. 2. In addition, operation S250 may be performed by the server 2000 or via the SIP server 3000.

Even if there is no third contact information in the first local contact list, the first electronic device 1100 according to an embodiment may cause the third electronic device to participate in the group call by enabling the second electronic device 1200 to invite the third electronic device 1300 to the group call.

Operation S255 is an operation in which the second electronic device 1200 requests the third electronic device 1300 to participate in the group call. Operation S255 may be performed by the second electronic device 1200 as shown in FIG. 2. In addition, operation S255 may be performed on the server 2000 or via the SIP server 3000.

In operation S235 to operation S260, each operation may be performed using the SIP server 3000. The group call using the SIP server 3000 will be described later with reference to FIG. 14.

Figure 3:
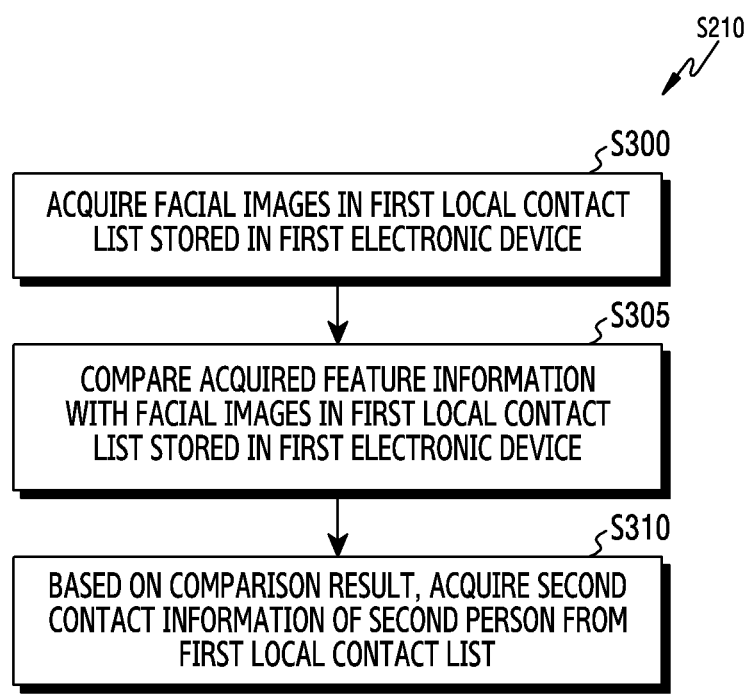
FIG. 3 is a flowchart illustrating an operation of acquiring second contact information of a second person by the first electronic device according to an embodiment of the disclosure.

FIG. 3 is a flowchart illustrating an operation of acquiring the second contact information of the second person by the first electronic device 1100 according to an embodiment of the disclosure.

Operation S300 and operation S305 of FIG. 3 may correspond to operation S210 of FIG. 2.

In operation S300, the first electronic device 1100 may acquire multiple facial images in the first local contact list. The first local contact list may include facial images of several people, and the first electronic device 1100 may extract, from the first local contact list, the facial images of the several people included in the first local contact list.

In operation S305, the first electronic device 1100 may compare the feature information of the faces acquired in operation S205 with facial images in the first local contact list stored in the first electronic device. The first electronic device 1100 may determine a similarity between the feature information of the faces acquired in operation S205 and the facial images acquired from the first local contact list.

In operation S310, the first electronic device 1100 may acquire the second contact information of the second person from the first local contact list, based on a comparison result. The first electronic device 1100 may select, from among the facial images acquired from the first local contact list, a facial image having a similarity degree equal to or greater than a threshold value with respect to the facial feature information of the second person. The first electronic device 1100 may extract the second contact information of the second person corresponding to the selected facial image from the first local contact list.

The first electronic device 1100 according to an embodiment may acquire, from the memory, contact information of at least one person among the multiple people in the designated image, and may make a call to the at least one person to enable participation in the group call. Here, the at least one person may include, for example, the second person in operation S300 to operation S310.

For example, a person image stored in a photo album of the first electronic device 1100 or a facial image selected by designating at least a partial area of the person image may be stored in the local contact list of the electronic device. Multiple person images or multiple facial images may be stored in the local contact list. When stored in the local contact list, at least one person image or at least one facial image may be mapped to or included in person information stored in the local contact list. At least one person image or at least one facial image may be mapped to or included in person information of a person stored in the local contact list.

For example, the first electronic device 1100 may add, based on a user input, a facial image of the second person, which is stored in a photo album memory, to the person information of the second person stored in the first local contact list. In addition, the first electronic device 1100 may add the facial image of the second person, which is stored in the photo album memory, to the person information of the second person stored in the first local contact list, by using a facial recognition engine configured for the first electronic device or the server 2000. In addition, the first electronic device 1100 may also store, together with at least one person image or at least one facial image, facial feature information extracted from the person image or facial image.

Figure 4:
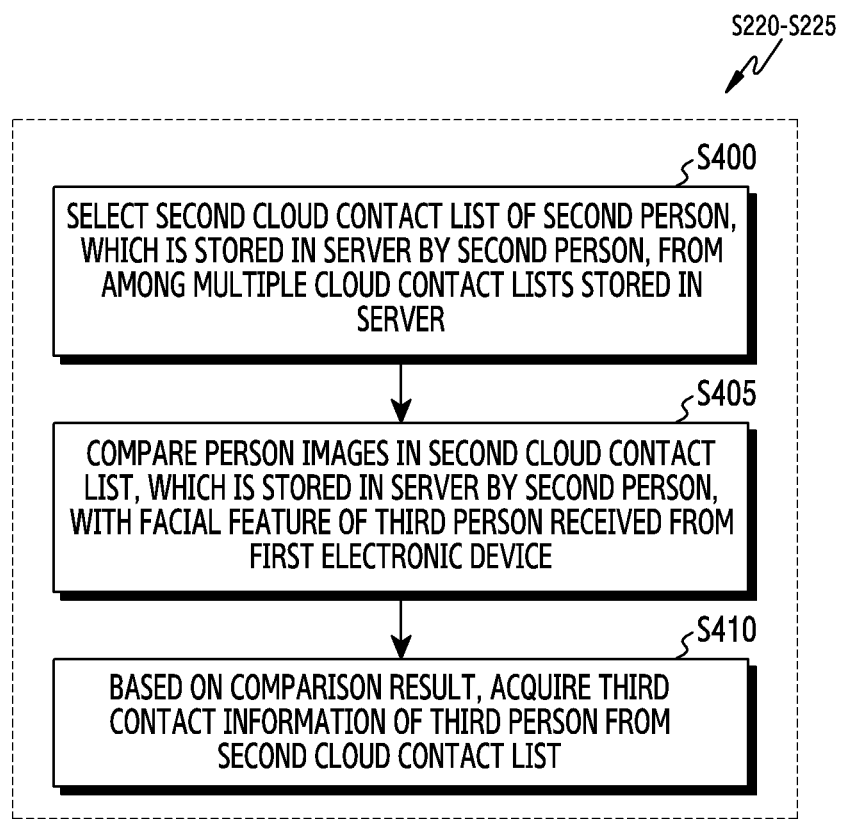
FIG. 4 is a flowchart of a method of acquiring, by a server, third contact information of a third person from a second cloud contact list of the second person according to an embodiment of the disclosure.

FIG. 4 is a flowchart of a method of acquiring, by the server, the third contact information of the third person from the second cloud contact list of the second person according to an embodiment of the disclosure. Operation S400 to operation S410 of FIG. 4 may correspond to operation S220 to operation S225 of FIG. 2.

Operation S400 to operation S410 may be performed by the server 2000.

Operation S400 is an operation of selecting the second cloud contact list of the second person, which is stored in the server 2000 by the second person, from among the multiple cloud contact lists stored in the server 2000. The server 2000 selects the second cloud contact list of the second person stored in the server 2000, based on reception of the second contact information of the second person from the first electronic device 1100.

Operation S405 is an operation of comparing a facial feature of the third person, which is received from the first electronic device 1100, with person images in the second cloud contact list stored in the server 2000 by the second person. The server 2000 may determine a similarity degree between the facial images acquired from the second cloud contact list and the feature information of the faces acquired from the first electronic device 1100 in operation S215. The server 2000 may determine the similarity degree between the facial images and the feature information of the faces by using the facial recognition engine.

Operation S410 is an operation of identifying the third contact information from the second cloud contact list, based on a comparison result.

The server 2000 may select, from among the facial images acquired from the second cloud contact list, a facial image having a similarity degree equal to or greater than a threshold value with respect to the facial feature information of the third person. The server 2000 may identify the third contact information of the third person corresponding to the selected facial image from the second cloud contact list.

Figure 5:
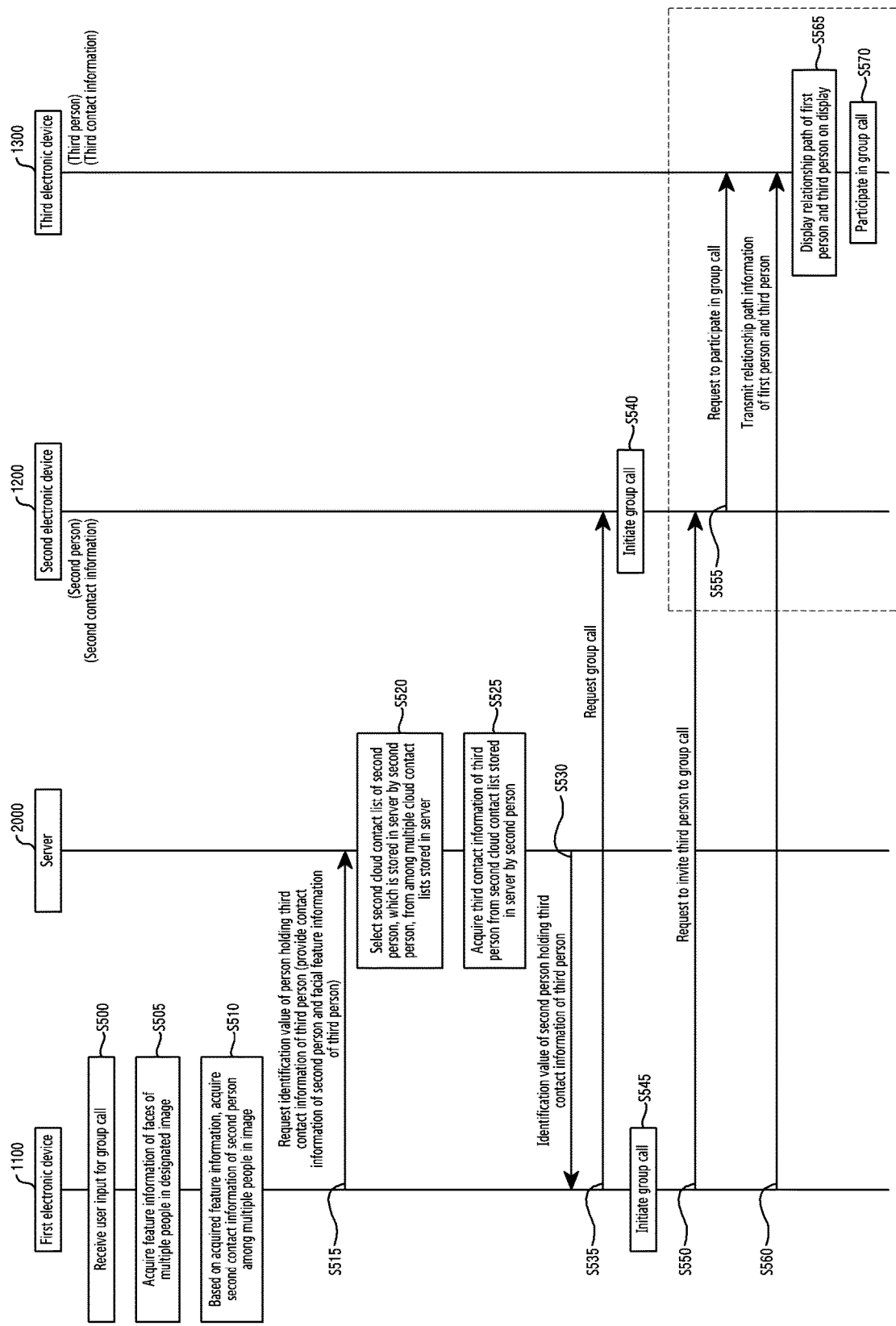
FIG. 5 is a flowchart of a method of displaying information on the group call on a display screen of the third electronic device requested to participate in the group call according to an embodiment of the disclosure.

FIG. 5 is a flowchart of a method of displaying information on the group call on a display screen of the third electronic device 1300 requested to participate in the group call according to an embodiment of the disclosure.

Descriptions of operation S500 to operation S555 and operation S570 overlap with descriptions of operation S200 to operation S255 and operation S260, and are thus skipped. Referring to FIG. 5, information on a relationship between the first person and the third person may be displayed on the third electronic device 1300 of the third person who is requested to participate in the group call. In comparison with FIG. 2, operation S560 and operation S565 may be added to FIG. 5.

In operation S560, the third electronic device 1300 according to an embodiment may receive information related to a relationship path of the first person and the third person, and a request to participate in the group call. The relationship path between the first person and the third person may indicate that the first person holds the second contact information without holding the third contact information of the third person, and that the second person holds the third contact information in the second cloud contact list.

In operation S560, the third electronic device 1300 according to an embodiment may acquire the information on the relationship path between the first person and the third person from the server 2000 or the SIP server 3000. The third electronic device 1300 may acquire the information on the relationship path between the first person and the third person due to the first electronic device 1100 or the second electronic device 1200 from the server 2000 or the SIP server 3000. The third electronic device 1300 may receive the information on the relationship path between the first person and the third person from the first electronic device 1100 or the second electronic device 1200 via the server 2000 or the SIP server 3000. As in operation S560, the first electronic device 1100 may transmit the information on the relationship path between the first person and the third person to the third electronic device 1300 via the server 2000 or the SIP server 3000.

The third electronic device 1300 according to an embodiment may display the acquired information on the relationship path between the first person and the third person on the display screen, as in operation S565. Displaying of information related to the group call, which includes the information on the relationship path of the first person and the third person, on the display screen of the electronic device will be described with reference to FIGS. 6 and 7.

Figure 6:
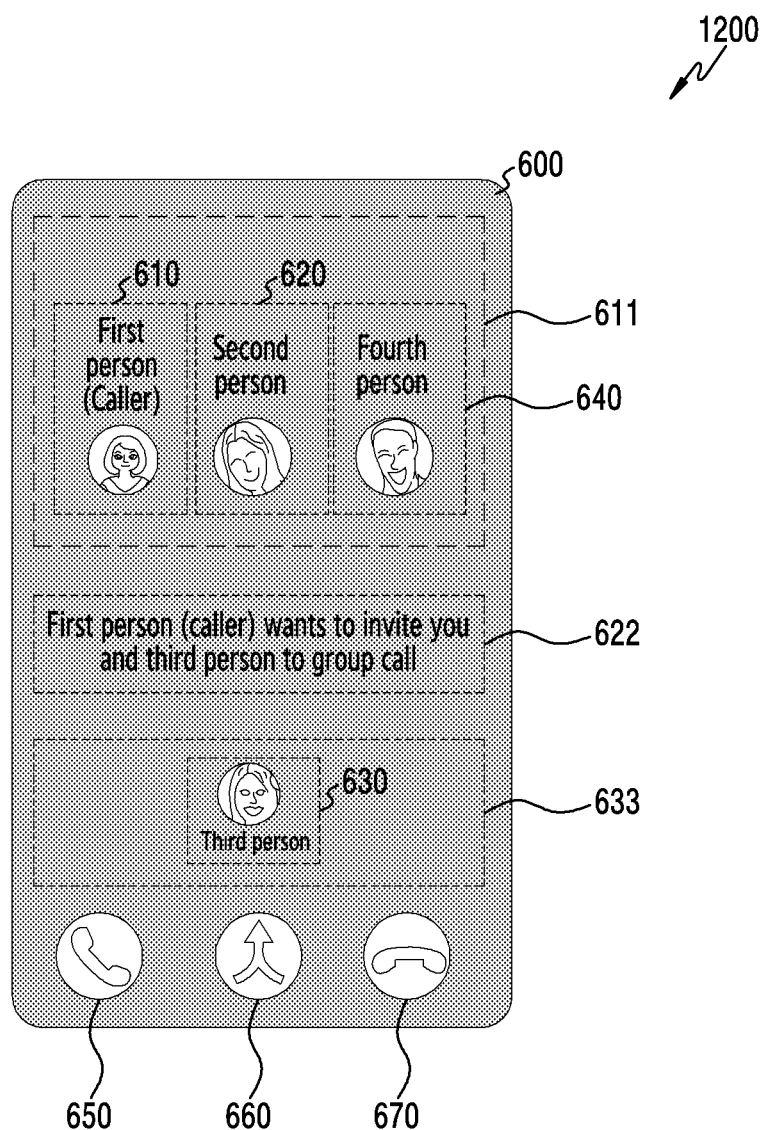
FIG. 6 is a diagram illustrating a user interface displayed on a display screen of the second electronic device according to an embodiment of the disclosure.

FIG. 6 is a diagram illustrating a user interface 600 displayed on the display screen of the second electronic device according to an embodiment of the disclosure. When the second electronic device 1200 receives a request for the group call, the user interface 600 including information on the group call may be displayed on the display screen of the second electronic device 1200.

The user interface 600 according to an embodiment may display a caller of the group call. The user interface 600 may display at least one person among multiple people invited to the group call by the caller. The user interface 600 may display a relationship between a recipient (i.e., the second person) and at least one person among the multiple invited people or the caller of the group call. The user interface 600 may display the designated image (e.g., the designated image 100 in FIG. 1) including multiple people related to the group call.

The information on the group call, which is included in the user interface 600, according to an embodiment may be information on the caller of the group call, information on at least one person among the multiple people invited to the group call, or information on the relationship between a recipient and at least one person among the multiple invited people or the caller.

The user interface 600 may include at least one object to indicate that a calling subject of the group call is the first person who is the user of the first electronic device. For example, an object 610 may include information on the caller (e.g., the first person) of the group call. For example, the object 610 may include the caller's phone number.

The recipient (e.g., the second person) of FIG. 6 may hold the caller's phone number (e.g., the first contact information) in a local contact list (e.g., the second local contact list) or a cloud contact list (e.g., the second cloud contact list). Alternatively, the recipient of FIG. 6 may receive the first contact information from the first electronic device 1100 or the server (e.g., the server 2000 or the SIP server 3000). The object 610 may include at least some of the stored first contact information. The object 610 may include at least one of the caller's name and the caller's facial image, based on the received information or information held by the recipient.

The user interface 600 may include at least one object for indicating the second person, the third person, or a fourth person among the multiple people invited to the group call by the caller (e.g., the first person). For example, an object 620, an object 630, or an object 640 may include information on the second person, the third person, or the fourth person, respectively. For example, the object 630 may include the third person's phone number. The recipient of FIG. 6 may hold the personal information (e.g., the third contact information and facial images of the third person) of the third person in the local contact list or the cloud contact list. Alternatively, the recipient of FIG. 6 may receive the third contact information from the first electronic device 1100 or the server (e.g., the server 2000 or the SIP server 3000). The object 630 may include the personal information (e.g., the third person's name and the third person's facial image) of the third person. The object 630 may include at least one of the third person's name and the third person's facial image, based on the received information or the third person's person information already held by the recipient.

The user interface 600 may display a relationship between the caller (e.g., the first person) and the recipient (e.g., the second person). Alternatively, the user interface 600 may display a relationship between the recipient and at least one person among the multiple invited people. For example, the object 610 and the object 620 may be placed together in a designated area (e.g., an area 611 of FIG. 6) of the user interface 600 so as to indicate that the caller has the recipient's phone number (e.g., the second contact information). On the other hand, the object 630 may be placed in another area (e.g., an area 633 of FIG. 6) distinct from the area 611 so as to indicate that the caller does not have the third person's phone number (e.g., the third contact information).

The user interface 600 may further include an object 622 for indicating information on the group call. The object 622 may indicate, for example, a request of the caller to invite the recipient and the third person to the group call.

The user interface 600 may display at least some areas of the designated image (e.g., the designated image 100 in FIG. 1) including multiple people related to the group call. The at least some areas of the designated image may be included in the object 610, object 620, object 630, or object 640. To this end, the second electronic device 1200 may receive images for the at least some areas of the designated image via the server 2000 or the SIP server 3000.

Referring to FIG. 6, the user of the second electronic device 1200 may accept or reject the group call request, and may accept or reject the request to invite the third person to the group call. The user interface 600 according to an embodiment may include an object 650 for accepting of the group call request, an object 670 for rejecting of the group call request, an object 660 for accepting of the request to invite the third person to the group call, or an object for rejecting of the request to invite the third person to the group call. In FIG. 6, the group call between the first electronic device 1100 and the second electronic device 1200 may be initiated based on the second electronic device 1200 receiving a user input for the object 650 (e.g., operation S240 and operation S245 of FIG. 2, or operation S545 and operation S550 of FIG. 5). In FIG. 6, the second electronic device 1200 may transmit a request to participate in the group call to the third electronic device 1300, based on reception of a user input for the object 660 (e.g., operation S255 of FIG. 2, or operation S555 of FIG. 5). Operation S555 according to an embodiment may be performed simultaneously with operation S540 or may be performed prior to operation S545.

Figure 7:
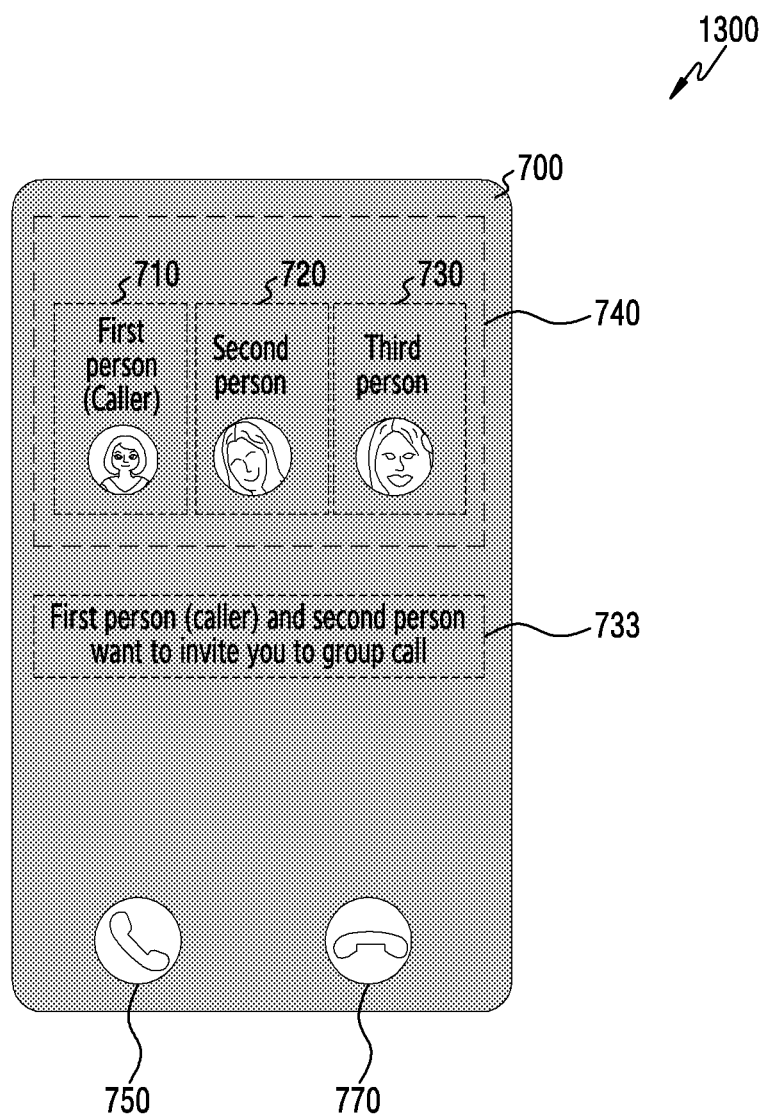
FIG. 7 is a diagram illustrating a user interface displayed on a display screen of the third electronic device according to an embodiment of the disclosure.

FIG. 7 is a diagram illustrating a user interface 700 displayed on the display screen of the third electronic device 1300 according to an embodiment of the disclosure. When the third electronic device 1300 receives a request to participate in the group call, a user interface 700 including information on the group call may be displayed on the display screen of the third electronic device 1300.

The user interface 700 according to an embodiment may display the caller of the group call. The user interface 700 may display at least one person among multiple people invited to the group call by the caller. The user interface 700 may display a relationship between a recipient (i.e., the third person) and at least one of a person holding the recipient's phone number (e.g., the third contact information) or the caller of the group call. The user interface 700 may display the designated image (e.g., the designated image 100 in FIG. 1) including multiple people related to the group call.

The user interface 700 may include at least one object to indicate that the caller of the group call is the first person who is the user of the first electronic device. For example, an object 710 may include information on the caller (e.g., the first person) of the group call. For example, the object 710 may include the caller's phone number.

The recipient (e.g., the third person) of FIG. 7 may hold the caller's person information in a local contact list (e.g., the third local contact list) or a cloud contact list (e.g., the third cloud contact list). Alternatively, the recipient of FIG. 7 may receive the first contact information from the first electronic device 1100 or the server (e.g., the server 2000 or the SIP server 3000). The object 710 may include at least some of the stored person information of the first person. The object 710 may include at least one of the caller's name and the caller's facial image, based on the received information or information held by the recipient.

The user interface 700 may include at least one object for indicating the recipient (e.g., the third person) and a person (e.g., the second person) who has directly invited the recipient to the group call from among the multiple people invited to the group call by the caller (e.g., the first person). For example, an object 720 or an object 730 may include information on the second person or the third person, respectively. For example, the object 720 may include the second person's phone number. The recipient of FIG. 7 may hold the second person's phone number in the local contact list or the cloud contact list. Alternatively, the recipient of FIG. 7 may receive the second contact information from the first electronic device 1100, the second electronic device 1200, or the server (e.g., the server 2000 or the SIP server 3000). The object 720 may include at least some of the stored person information of the second person. The object 720 may include at least one of the second person's name and the second person's facial image, based on the received information or information held by the recipient.

The user interface 700 may display a relationship between the caller (e.g., the first person) and the recipient (e.g., the third person). The user interface 700 may display a relationship between the recipient and a person (e.g., the second person) who has directly invited the recipient to the group call. For example, the object 710, the object 720, and the object 730 may be placed together in a designated area (e.g., an area 740 of FIG. 7) of the user interface 700 so as to indicate that the caller holds a phone number of the person who has directly invited the recipient to the group call, and that the person who has directly invited the recipient to the group call holds a phone number of the recipient. The object 710, the object 720, and the object 730 may be placed together in the designated area (e.g., the area 740 of FIG. 7) of the user interface 700 so as to indicate that the relationship between the caller and the recipient is connected via the second person. In the application, the relationship distance between the first person and the second person may be 2. Among the multiple people requested for the group call, a person, a relationship distance of which with respect to the recipient exceeds a threshold distance, may not be displayed on the user interface 700.

The user interface 700 may further include an object 733 for displaying information on the group call. The object 733 may display, for example, the caller who is to invite the recipient to the group call and a request of the second person.

The user interface 700 may display at least some areas of the designated image (e.g., the designated image 100 in FIG. 1) including multiple people related to the group call. The at least some areas of the designated image may be included in the object 710, the object 720, and the object 730. To this end, the third electronic device 1300 may receive images for the at least some areas of the designated image via the server 2000 or the SIP server 3000.

Referring to FIG. 7, the user of the third electronic device 1300 may accept or reject the group call request. The user interface 700 according to an embodiment may include an object 750 for accepting of the group call request and an object 770 for rejecting of the group call request. In FIG. 7, the group call between the first electronic device 1100, the second electronic device 1200, and the third electronic device 1300 may be initiated based on the third electronic device 1300 receiving a user input for the object 750 (e.g., operation S260 of FIG. 2, or operation S570 of FIG. 5). In FIG. 7, the third electronic device 1300 may reject the group call request, based on reception of a user input for the object 770.

Figure 8:
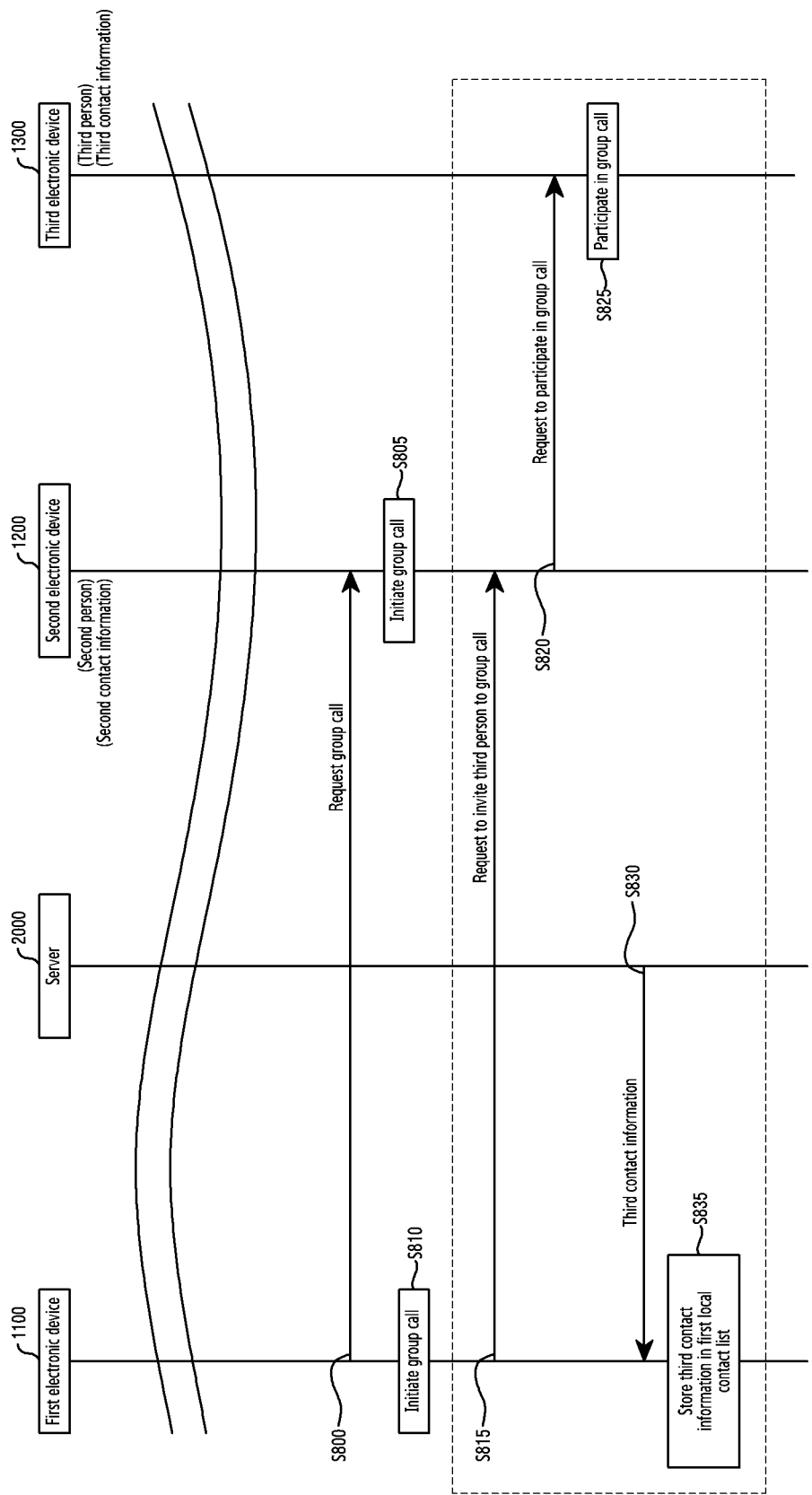
FIG. 8 is a diagram illustrating a procedure of storing the third contact information of the third electronic device in a first local contact list according to an embodiment of the disclosure.

FIG. 8 is a diagram illustrating a procedure of storing the third contact information of the third electronic device 1300 in the first local contact list according to an embodiment of the disclosure. Operation S800 to operation S835 may be operations subsequent to operation S230 of FIG. 2. Descriptions of operation S800 to operation S825 overlap with descriptions of operation S235 to operation S260, and are thus skipped.

Referring to FIG. 8, the second cloud contact list may have the third contact information.

The third contact information according to an embodiment may be shared with the first electronic device 1100 when the third electronic device participates in the group call. Operation S830, in which the third contact information is shared with the first electronic device 1100, may be performed under a sufficient condition that operation S825 or operation S820 is completed.

In operation S830, the server 2000 may transmit the third contact information to the first electronic device 1100. The second electronic device 1200 or the third electronic device 1300 may transmit the third contact information to the first electronic device 1100. In operation S830, the first electronic device 1100 may receive the third contact information. The first electronic device 1100 may receive the third contact information from the server 2000, the second electronic device 1200, or the third electronic device 1300.

In operation S835, the first electronic device 1100 may store, in the first local contact list, the third contact information received in operation S830. The first electronic device 1100 may store, in the first cloud contact list, the third contact information received in operation S830.

At least some of the feature information (e.g., the feature information of faces of the multiple people acquired in operation S205 of FIG. 2) of faces of the multiple people acquired by the first electronic device 1100 according to an embodiment may be stored in the first local contact list (e.g., the first local contact list 110 of FIG. 1) of the first electronic device 1100 or the first cloud contact list of the first electronic device 1100. For example, in FIG. 8, the facial feature information of the second person acquired by the first electronic device 1100 may be included and stored in the person information of the second person included in the first local contact list 110. In addition, the facial feature information of the third person acquired by the first electronic device 1100 may be stored together as the person information of the third person when the third contact information of the third person, which is received in operation S830, is stored in the first local contact list 110 as in operation S835.

Some of the feature information of the faces of the multiple people, which the server 2000 receives from the first electronic device 1100, according to an embodiment may be stored in multiple cloud contact databases in the server 2000. For example, the server 2000 may store the facial feature information of the second person, which is received from the first electronic device 1100, as the person information of the second person in the first cloud contact list stored in the server 2000 by the first person. For example, based on the second person holding the contact information of the third person, the server 2000 may store the facial feature information of the third person, which is received from the first electronic device 1100, as the person information of the third person in the second cloud contact list stored in the server 2000 by the second person.

Figure 9:
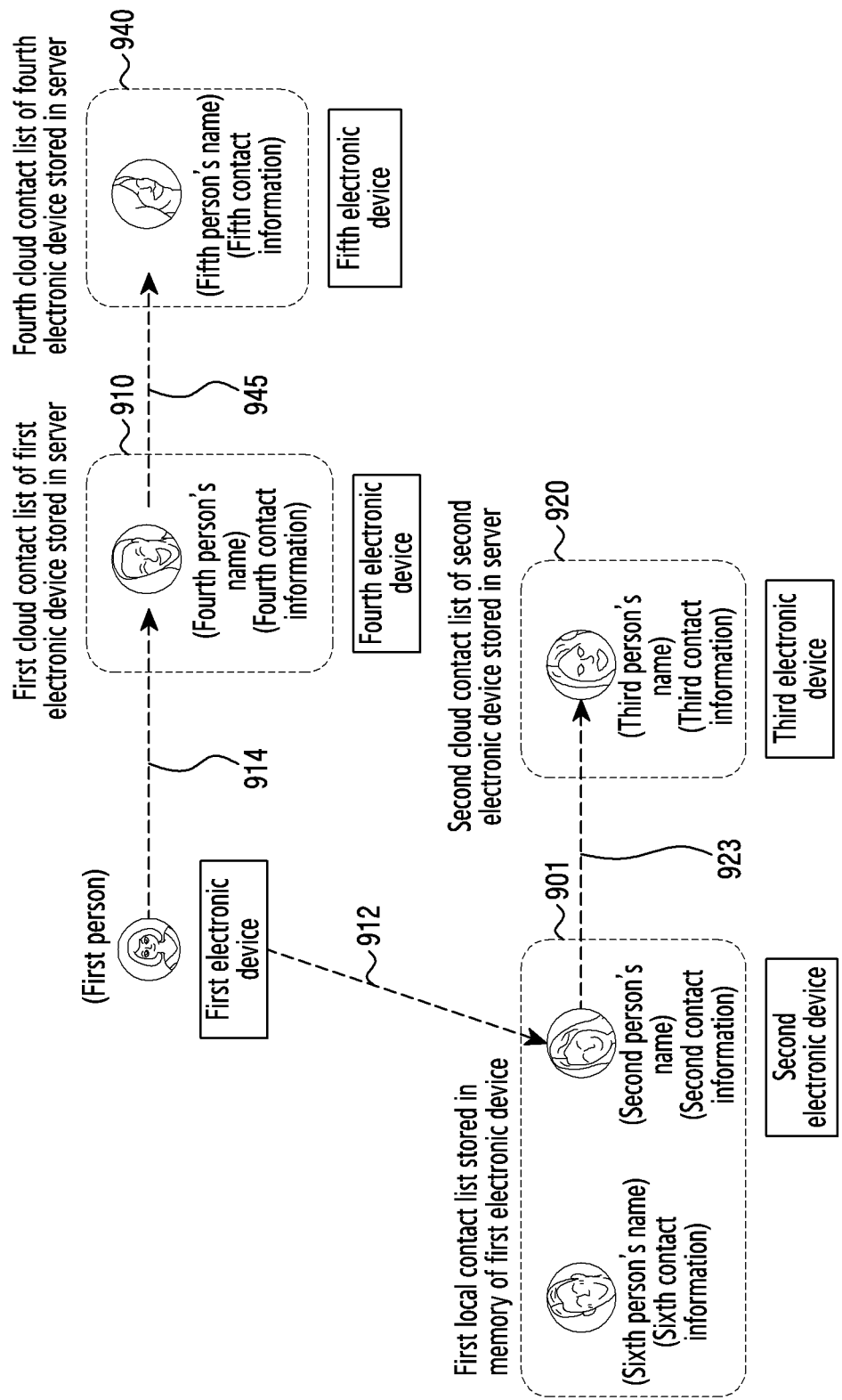
FIG. 9 is a diagram illustrating a local contact list and multiple cloud contact lists according to an embodiment of the disclosure.

FIG. 9 is a diagram illustrating a local contact list and multiple cloud contact lists according to an embodiment of the disclosure.

A first local contact list 901 may be stored in the memory of the first electronic device 1100.

A cloud contact database may be configured in the server 2000. Referring to FIG. 9, the cloud contact database may include a first cloud contact list 910 stored in the server by the first electronic device 1100, a second cloud contact list 920 stored in the server by the second electronic device 1200, or a fourth cloud contact list 940 stored in the server by the fourth electronic device 1400.

The first local contact list 901 may store the person information (e.g., the second person's facial image and second contact information) of the second person. The person information of the fourth person may be stored in the first cloud contact list 910. The person information of the third person may be stored in the second cloud contact list 920. The person information of the fifth person may be stored in the fourth cloud contact list 940.

Since the second contact information is stored in the first local contact list 901, the first electronic device 1100 may as in operation S210 of FIG. 2 and operation S300 to operation S310 of FIG. 3, request the group call from the second electronic device, based on the second contact information acquired from the first local contact list 901.

The third contact information is not stored in the first local contact list 901 and the first cloud contact list 910, but is stored in the second cloud contact list 920, so that, as in operation S210 to operation S230 of FIG. 2, operation S300 to operation S310 of FIG. 3, and operation S400 to operation S410 of FIG. 4, the first electronic device 1100 may request the group call from the third electronic device 1300 via the second electronic device 1200, based on the identification value of the second person acquired from the server.

Referring to FIG. 9, each arrow 912, 923, 914, or 945 may indicate that a caller (e.g., a start point of the arrow) holds a phone number of a recipient (e.g., an end point of the arrow) in the caller's contact list (local contact list or cloud contact list) so that a call request is possible without going through another person in the middle.

In the document, a minimum number of arrows required for a caller of a group call to request the group call from a recipient may be defined as a relationship distance. When a recipient's phone number is stored in a caller's contact list (local contact list or cloud contact list), a relationship distance between the caller and the recipient is 1. In addition, the relationship distance between the caller's electronic device and the recipient's electronic device may be 1. In a case where a recipient's phone number is not stored in a contact list held by a caller and, at the same time, the recipient's phone number is stored in a contact list held by another person whose phone number is held by the caller, so that the caller requests a group call from the another person and the recipient, a relationship distance between the caller and the recipient is 2.

For example, in FIG. 9, since the first person (caller) may request the group call from the second person (recipient), based on the first local contact list 901 of the first electronic device 1100, a relationship distance between the first person and the second person (or the first electronic device and the second electronic device) is 1. In FIG. 9, the second person (caller) may request the group call from the third person (recipient), based on the second cloud contact list 920, and therefore a relationship distance between the second person and the third person is 1. In FIG. 9, the first person (caller) may request the group call from the fourth person (recipient), based on the first cloud contact list 910, and therefore a relationship distance between the first person and the fourth person is 1. Likewise, in FIG. 9, a relationship distance between the fourth person (caller) and the fifth person (recipient) is 1.

For example, in FIG. 9, the first person (caller) may request the group call from the third person (recipient), based on the first local contact list 901 of the first person and the second cloud contact list 920 of the second person (caller), and therefore a relationship distance between the first person and the third person is 1. In FIG. 9, the first person (caller) may request the group call from the fifth person (recipient), based on the first cloud contact list 910 of the first person and the fourth cloud contact list of the fourth person, and therefore a relationship distance between the first person and the fifth person is 2.

In the document, since the minimum number of arrows required for a caller of a group call to request the group call from a recipient is defined to be a relationship distance, when the caller of the group call is the first person in FIG. 9, a relationship distance between the second person and the fourth person is 2. Likewise, when the caller of the group call is the first person, a relationship distance between the fourth person and the third person is 3.

In the group call according to an embodiment, a case where a relationship distance with a caller is 2 or less and a case where a relationship distance with a caller exceeds 2 may be treated separately. For example, the first person may request the group call from the second to fifth people having the relationship distance of 2 or less with respect to the first person. On the other hand, the first person cannot request the group call from any person having a relationship distance with respect to the first person exceeding 2. In this way, a maximum value of a relationship distance with respect to a caller, which enables a group call request may be defined to be a threshold distance. As above, when the group call cannot be requested for any person having a relationship distance exceeding 2 with respect to a caller, a threshold distance is 2. A threshold distance is not limited to 2, and may be variously configured.

In the group call according to an embodiment, a case where a relationship distance with a caller is 1 and a case where a relationship distance with a caller is other than 1 may be treated separately. For example, in FIG. 6, the second and fourth people having the relationship distance of 1 with respect to the first person are treated differently from the third person having the relationship distance of 2 with respect to the first person. The user interface 600 displayed on the second electronic device 1200 displays the object 620 for displaying the second person and the object 640 for displaying the fourth person in the same area 611 as that for the object 610 for displaying the first person. The user interface 600 displays the object 630 for displaying the third person (the third person having the relationship distance of 2 with respect to the first person) in an area 633 that is different from the area 611 where the object 610 for displaying the first person is displayed.

In the group call according to an embodiment, a case where a relationship distance is 2 (e.g., between the second person and the fourth person) and a case where a relationship distance is 3 (e.g., between the third person and the fourth person) may be distinguished from each other. For example, as shown in FIG. 6, the second electronic device 1200 of the second person may display that the fourth person having the relationship distance of 2 with respect to the second person is invited to the group call. On the other hand, as shown in FIG. 7, the third electronic device 1300 of the third person may not display that the fourth person having the relationship distance of 3 with respect to the third person in the group call. Even before participation in (connection to) the group call, each person may recognize that another person having a relationship distance of 2 or less is invited to the group call. Whether another person having a relationship distance of 3 or more has been invited to the group call may be recognized after participation in (connection to) the group call.

Figure 10:
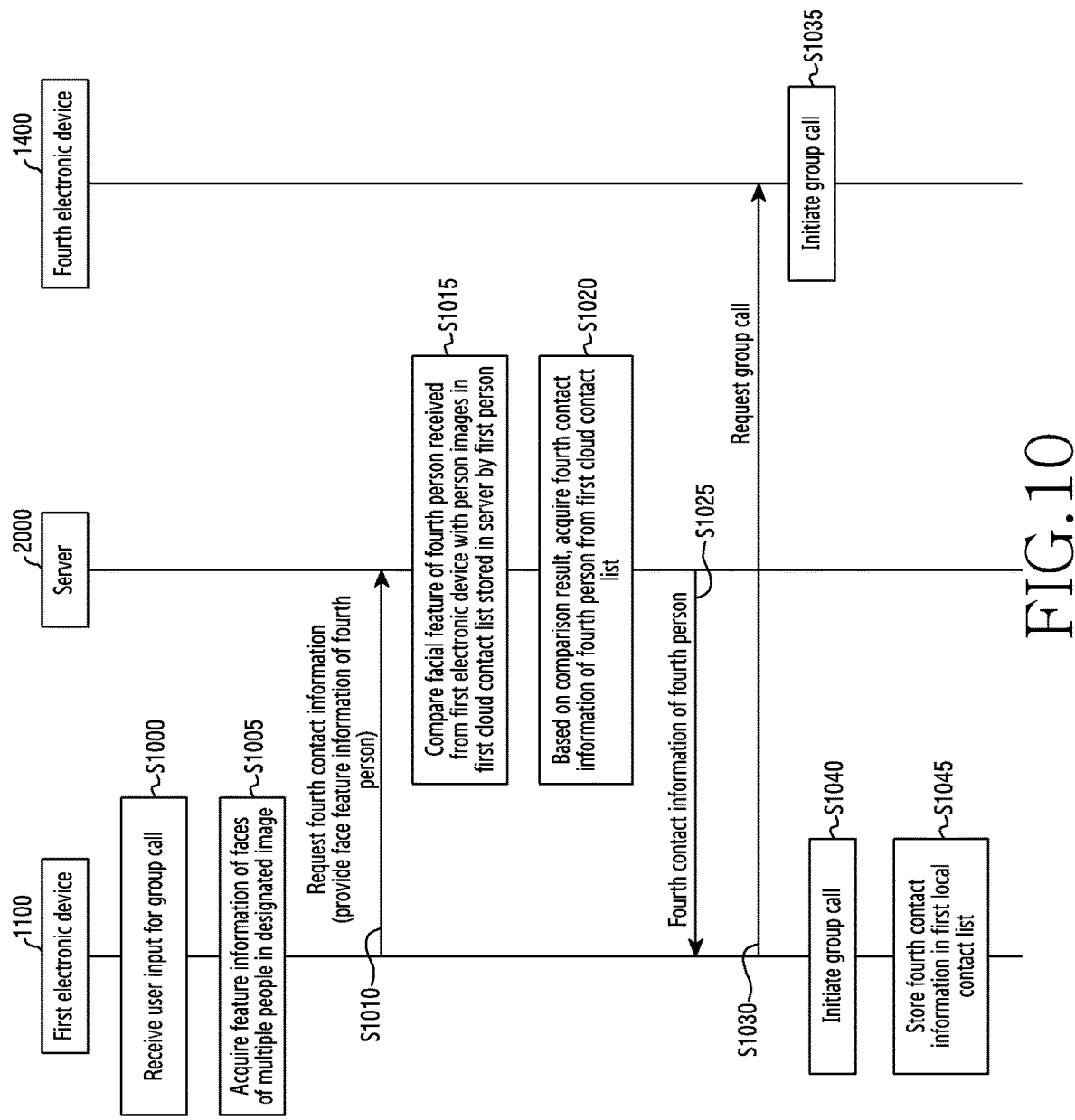
FIG. 10 is a flowchart of a method of acquiring, by the first electronic device, fourth contact information from a first cloud contact list so as to transmit a group call request to a fourth electronic device according to an embodiment of the disclosure.

FIG. 10 is a flowchart of a method of acquiring, by the first electronic device, fourth contact information from the first cloud contact list so as to transmit a group call request to the fourth electronic device 1400 according to an embodiment of the disclosure.

Descriptions of operation S1000 and operation S1005 overlap with descriptions of operation S200 and operation S205, and are thus skipped.

In operation S1010, the first electronic device 1100 may request the fourth contact information from the server 2000. Requesting of the fourth contact information may include providing facial feature information of the fourth person to the server 2000. In operation S1010, the first electronic device 1100 may provide the server 2000 with the facial feature information of the fourth person among feature information of faces acquired from the designated image in operation S1005.

The cloud contact database configured in the server 2000 may include the first cloud contact list (e.g., the first cloud contact list 910 of FIG. 9). The first cloud contact list may be stored in the server 2000 by the first person (or the first electronic device 1100).

In operation S1015, the server 2000 may compare facial images in the first cloud contact list with the facial feature information of the fourth person received from the first electronic device 1100. In operation S1020, the server 2000 may acquire the person information of the fourth person from the first cloud contact list, based on a comparison result of operation S1015.

In operation S1025, the server 2000 may transmit, to the first electronic device 1100, the fourth contact information of the fourth person acquired in operation S1020. In operation S1025, the first electronic device 1100 may receive, from the server 2000, the fourth contact information of the fourth person acquired in operation S1020.

In operation S1030, the first electronic device 1100 may request the group call from the fourth electronic device 1400. The first electronic device 1100 may request the group call from the fourth electronic device 1400, based on the fourth contact information received in operation S1025. In operation S1030, the fourth electronic device 1400 may receive a group call request from the first electronic device 1100.

In operation S1035, the fourth electronic device 1400 may receive a user input associated with the group call. The fourth electronic device 1400 may receive the user input for the group call request that is received in S1030. The fourth electronic device 1400 may receive the user input to respond to the group call request. The fourth electronic device 1400 may initiate the group call, based on reception of the user input.

In operation S1040, the first electronic device 1100 may initiate the group call with the fourth electronic device 1400. The first electronic device 1100 may initiate the group call with respect to the fourth electronic device 1400, based on the fourth electronic device 1400 initiating the group call in operation S1035.

In operation S1045, the first electronic device 1100 may store the fourth contact information of the fourth electronic device 1400 in the first local contact list.

The first electronic device 1100 may store the fourth contact information of the fourth person, which is received in operation S1025, in the first local contact list. Operation S1045 may be performed after operation S1025 is completed.

Referring to FIG. 10, when the fourth person is invited to the group call, the object 640 including information on the fourth person may be displayed, as in FIG. 6, on the second electronic device of the second person having the relationship distance of 2 with respect to the fourth person.

Figure 11:
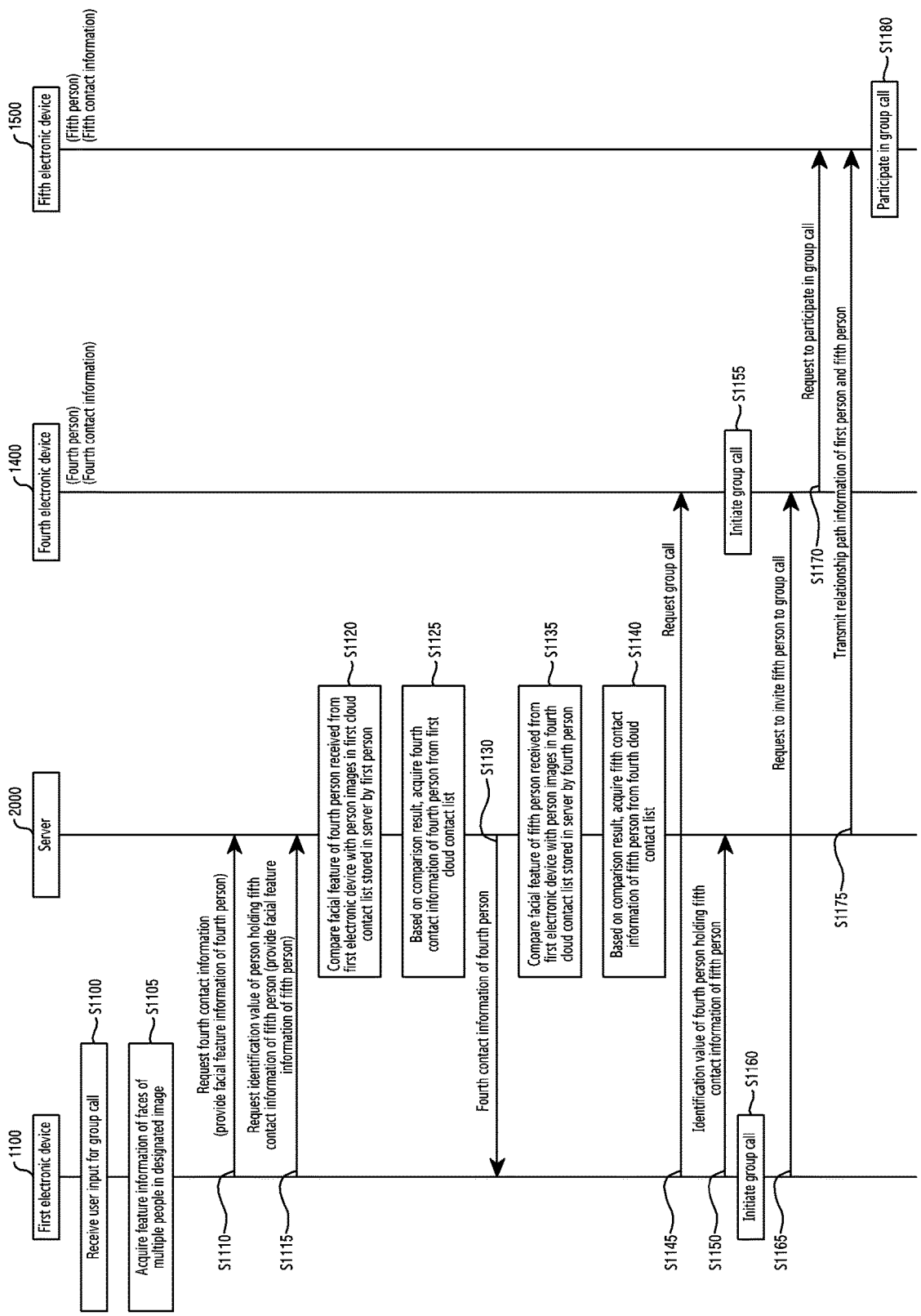
FIG. 11 is a flowchart of a method of requesting the group call by the first electronic device from the fourth electronic device and a fifth electronic device according to an embodiment of the disclosure.

FIG. 11 is a flowchart of a method of requesting the group call by the first electronic device from the fourth electronic device 1400 and a fifth electronic device 1500 according to an embodiment of the disclosure. The first electronic device 1100 may acquire the fourth contact information from the first cloud contact list so as to request the group call from the fourth electronic device 1400. The first electronic device 1100 may request the fourth electronic device 1400 to invite the fifth electronic device 1500 to the group call.

Descriptions of operation S1100 or operation S1105, operation S1110, operation S1120 or operation S1125, operation S1130, operation S1145, and operation S1155 or operation S1160 overlap with descriptions of operation S200 or operation S205, operation S1010, operation S1015 or operation S1020, operation S1025, operation S1030, and operation S1035 or operation S1040, and are thus skipped.

In operation S1115, the first electronic device 1100 may request, from the server 2000, an identification value of a person holding fifth contact information of the fifth person. The first electronic device 1100 may provide acquired facial feature information of the fifth person to the server 2000. In operation S1115, the server 2000 may receive the facial feature information of the fifth person.

In operation S1135, the server 2000 may compare the facial feature of the fifth person, which is received from the first electronic device 1100, with facial images in the fourth cloud contact list stored in the server by the fourth person. The server 2000 may select the fourth cloud contact list from among multiple cloud contact lists. The server 2000 may compare the facial feature of the fifth person, which is received from the first electronic device 1100, with person images in the fourth cloud contact list. In operation S1140, the server 2000 may acquire the fifth contact information of the fifth person from the fourth cloud contact list, based on a comparison result of operation S1135.

In operation S1150, the server 2000 may transmit, to the first electronic device 1100, an identification value of the fourth person holding the fifth contact information of the fifth person. In operation S1150, the server 2000 may transmit the identification value of the fourth person holding the fifth contact information to the first electronic device 1100, based on acquiring of the fifth contact information from the fourth cloud contact list in operation S1140. In operation S1150, the first electronic device 1100 may receive, from the server 2000, the identification value of the fourth person holding the fifth contact information.

In operation S1165, the first electronic device 1100 may request the fourth electronic device 1400 to invite the fifth person to the group call. The first electronic device 1100 may request the fourth electronic device 1400 to invite the fifth person to the group call, based on the identification value of the fourth person received in operation S1150. In operation S1165, the fourth electronic device 1400 may receive, from the first electronic device 1100, a message requesting to invite the fifth person to the group call.

In operation S1170, the fourth electronic device 1400 may request the fifth electronic device 1500 to participate in the group call. In response to the request received in operation S1165, the fourth electronic device 1400 may request the fifth electronic device 1500 to participate in the group call. In operation S1170, the fifth electronic device 1500 may receive, from the fourth electronic device 1400, a message requesting to participate in the group call.

In operation S1175, the server 2000 may transmit relationship path information of the first person and the fifth person to the fifth electronic device 1500. In operation S1175, the fifth electronic device 1500 may receive the relationship path information of the first person and the fifth person from the server 2000. The fifth electronic device 1500 may receive relationship path information of the first person and the fifth person from the first electronic device 1100 or the fourth electronic device 1400.

In operation S1180, the fifth electronic device 1500 may participate in the group call. The fifth electronic device 1500 may participate in the group call in response to the participation request received in S1170.

Figure 12:
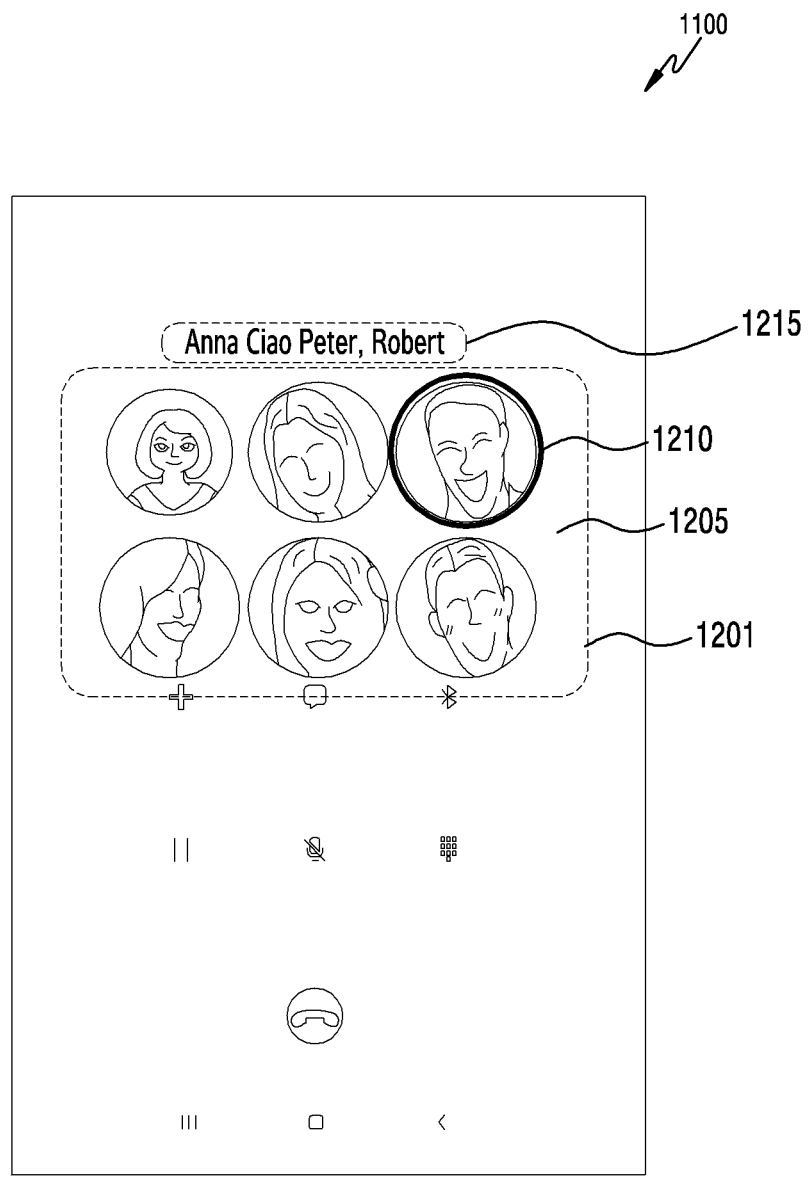
FIG. 12 is a diagram illustrating a user interface related to the group call service displayed on a display screen of the first electronic device according to an embodiment of the disclosure.

FIG. 12 is a diagram illustrating a user interface 1201 related to the group call service displayed on a display screen of the first electronic device 1100 according to an embodiment of the disclosure. The user interface 1201 may be displayed on a display screen of at least one electronic device among multiple electronic devices participating in the group call. The at least one electronic device may display the user interface 1201 including information on the group call on the display screen while the group call is in progress. The user interface 1201 may include information on multiple people participating in the group call. The user interface 1201 may include facial images of the multiple people participating in the group call, as shown in an area 1205. The user interface 1201 may include name information of the multiple people participating in the group call, as shown in an area 1215. The user interface 1201 may include an object 1210 for indicating that at least one person among the multiple people participating in the group call is currently speaking. For example, referring to FIG. 12, the object 1210 may indicate that the fourth person is currently speaking. The object 1210 may be displayed in the area 1205.

Figure 13:
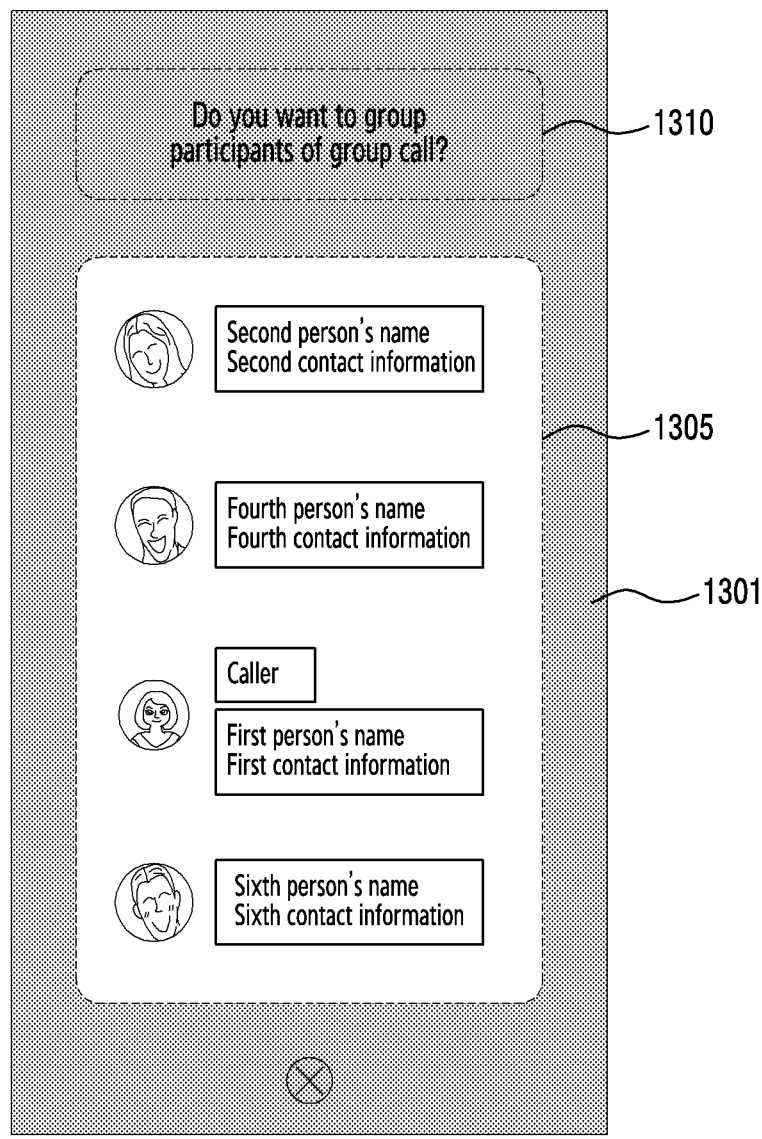
FIG. 13 is a diagram illustrating a user interface related to a group call service displayed on a display screen of an electronic device according to an embodiment of the disclosure.

FIG. 13 is a diagram illustrating a user interface 1301 related to the group call service displayed on a display screen of an electronic device according to an embodiment of the disclosure. The user interface 1301 may be displayed on a display screen of at least one electronic device among the multiple electronic devices participating in the group call. The user interface 1301 may include information on the multiple people participating in the group call, as shown in an area 1305. For example, the user interface 1301 may display a facial image, a name, and a phone number of each person among the multiple people. The user interface 1301 may include information on a caller, as shown in the area 1305.

The electronic device may group information on the multiple people participating in the group call within the local contact list or cloud contact list of the electronic device. The user interface 1301 may include an object 1310 for receiving a user input for grouping.

Figure 14:
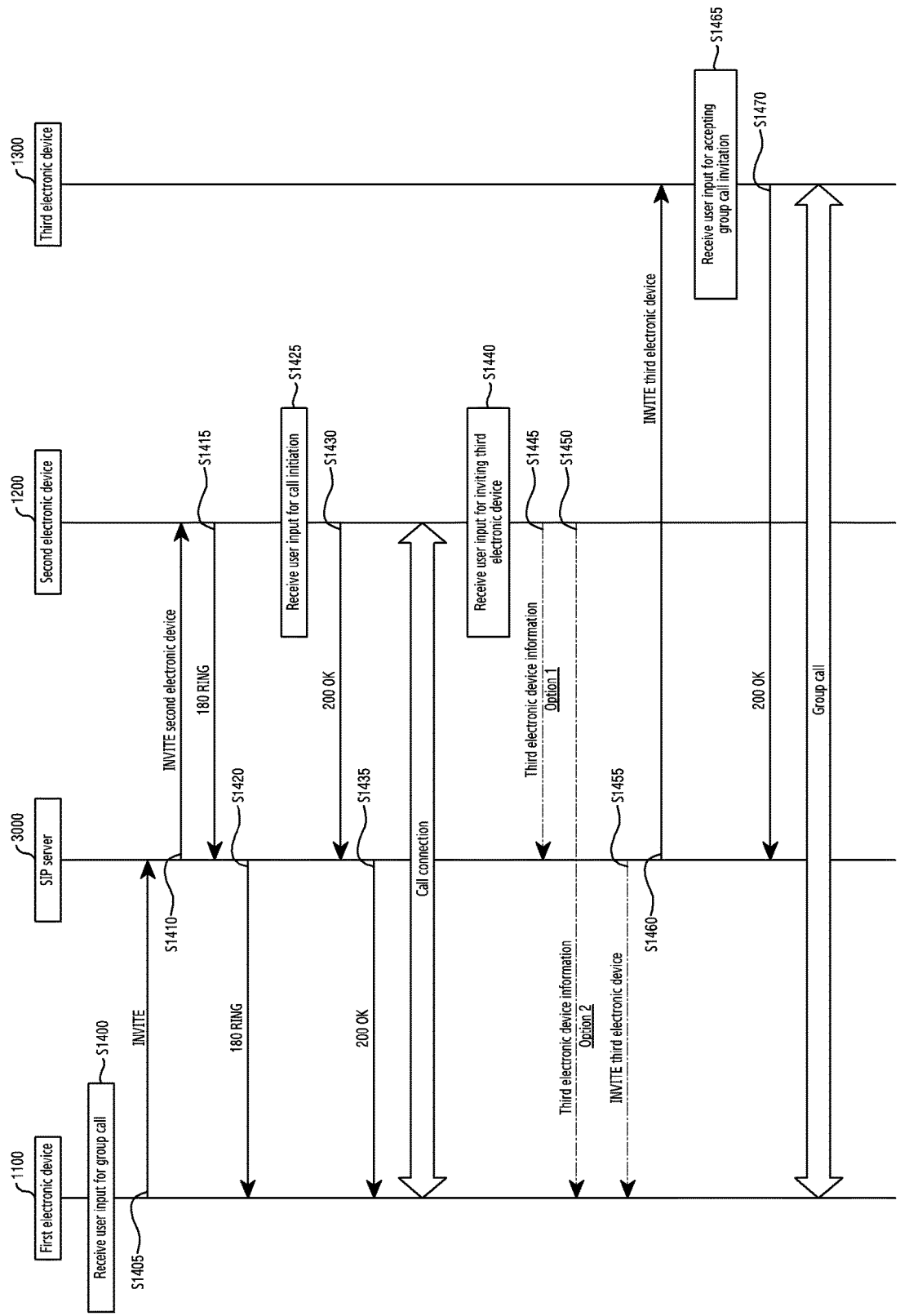
FIG. 14 is a flowchart illustrating a session initiation protocol (SIP) call process related to a group call according to an embodiment of the disclosure.

FIG. 14 is a flowchart illustrating an SIP call process related to a group call according to an embodiment of the disclosure.

FIG. 14 illustrates processes between the first electronic device 1100, the second electronic device 1200, the third electronic device 1300, and the SIP server 3000, for a group call between the first electronic device 1100, the second electronic device 1200, and the third electronic device 1300. The group call in FIG. 14 may be the group call in FIG. 2.

In operation S1400, the first electronic device 1100 may receive a user input for the group call. The first electronic device 1100 may receive the user input for the group call in relation to the designated image.

In operation S1405, the first electronic device 1100 may transmit an "INVITE" message to the SIP server 3000. In operation S1405, the SIP server 3000 may receive the "INVITE" message from the first electronic device 1100.

In operation S1410, the SIP server 3000 may transmit an "INVITE the second electronic device" message to the second electronic device 1200. In operation S1410, the second electronic device 1200 may receive the "INVITE the second electronic device" message from the SIP server 3000.

In operation S1415, the second electronic device 1200 may transmit a "180 RING" message to the SIP server 3000. In operation S1415, the SIP server 3000 may receive the "180 RING" message from the second electronic device 1200.

In operation S1420, the SIP server 3000 may transmit the "180 RING" message to the first electronic device 1100. In operation S1420, the first electronic device 1100 may receive the "180 RING" message from the SIP server 3000.

In operation S1425, the second electronic device 1200 may receive a user input to initiate the call.

In operation S1430, the second electronic device 1200 may transmit a "200 OK" message to the SIP server 3000. In operation S1430, the SIP server 3000 may receive the "200 OK" message from the second electronic device 1200.

In operation S1435, the SIP server 3000 may transmit the "200 OK" message to the first electronic device 1100. In operation S1435, the first electronic device 1100 may receive the "200 OK" message from the SIP server 3000.

When operation S1435 is performed in FIG. 14, the call between the first electronic device 1100 and the second electronic device 1200 may be connected.

In operation S1440, the second electronic device 1200 may receive a user input for inviting the third electronic device.

In operation S1445, the second electronic device 1200 may transmit a "third electronic device information" message to the SIP server 3000. In operation S1445, the SIP server 3000 may receive the "third electronic device information" message from the second electronic device 1200.

In operation S1450, the second electronic device 1200 may transmit the "third electronic device information" message to the first electronic device 1100. In operation S1450, the first electronic device 1100 may receive the "third electronic device information" message from the second electronic device 1200.

At least one of operation S1445 and operation S1450 is optional and may be thus skipped.

In operation S1455, the first electronic device 1100 may transmit an "INVITE third electronic device" message to the SIP server 3000. In operation S1455, the SIP server 3000 may receive the "INVITE third electronic device" message from the first electronic device 1100.

In operation S1460, the SIP server 3000 may transmit the "INVITE third electronic device" message to the third electronic device 1300. In operation S1460, the third electronic device 1300 may receive the "INVITE third electronic device" message from the SIP server 3000.

In operation S1465, the third electronic device 1300 may receive a user input for accepting the invitation to the group call.

In operation S1470, the third electronic device 1300 may transmit a "200 OK" message to the SIP server 3000. In operation S1470, the SIP server 3000 may receive the "200 OK" message from the third electronic device 1300.

When operation S1470 is performed in FIG. 14, the group call between the first electronic device 1100, the second electronic device 1200, and the third electronic device 1300 may be connected.

Figure 15:
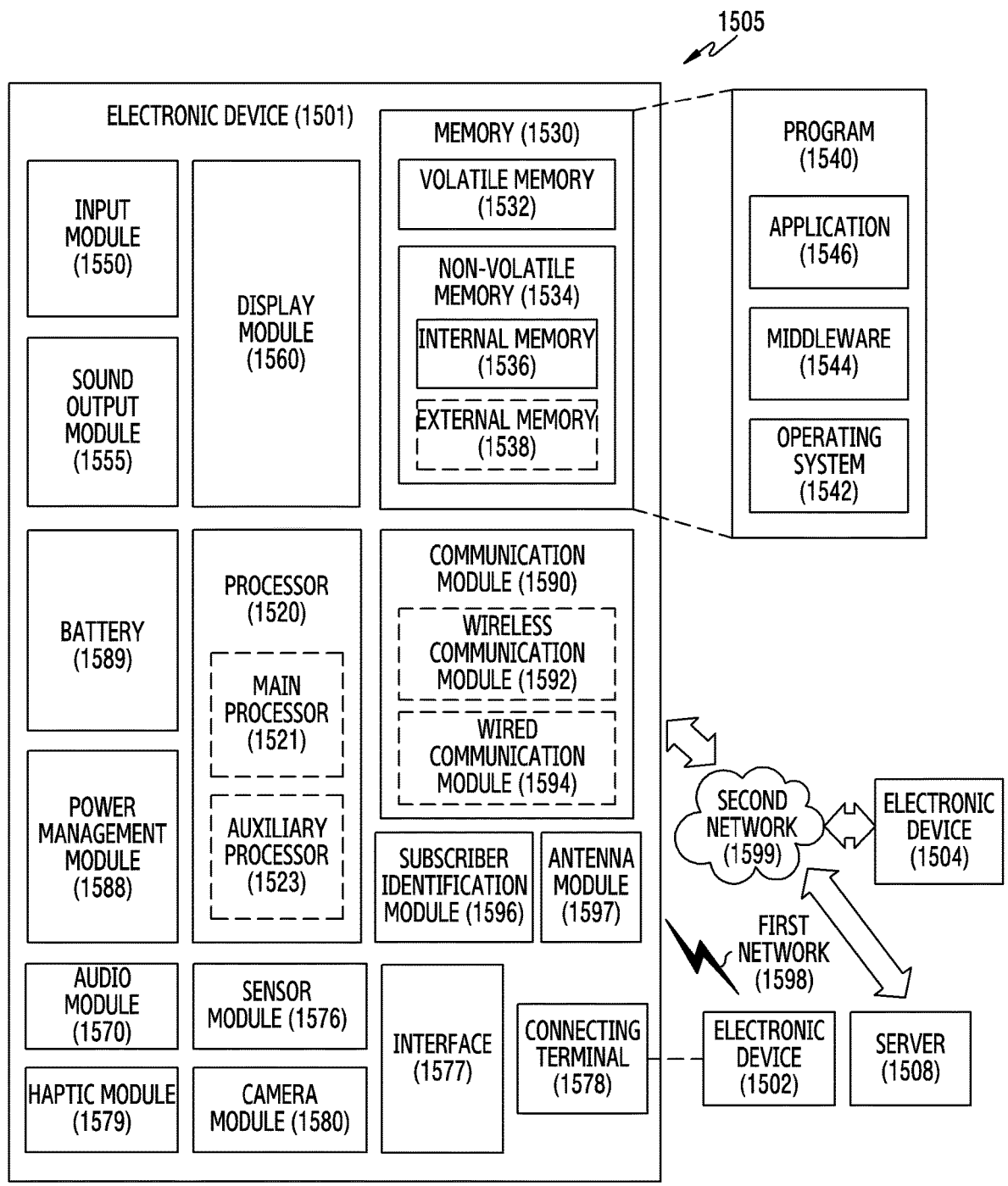
FIG. 15 is a block diagram of an electronic device in a network environment according to an embodiment of the disclosure.

FIG. 15 is a block diagram illustrating an electronic device 1501 in a network environment 1505 according to an embodiment of the disclosure. Referring to FIG. 15, the electronic device 1501 in the network environment 1505 may communicate with an electronic device 1502 via a first network 1598 (e.g., a short-range wireless communication network), or at least one of an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In some embodiments, at least one of the components (e.g., the connecting terminal 1578) may be omitted from the electronic device 1501, or one or more other components may be added in the electronic device 1501. In some embodiments, some of the components (e.g., the sensor module 1576, the camera module 1580, or the antenna module 1597) may be implemented as a single component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523. According to an embodiment, the auxiliary processor 1523 (e.g., the neural processing unit) may include a hardware structure specified for artificial intelligence model processing. An artificial intelligence model may be generated by machine learning. Such learning may be performed, e.g., by the electronic device 1501 where the artificial intelligence is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include at least one of the volatile memory 1532 or the non-volatile memory 1534. The non-volatile memory 1534 may include at least one of internal memory 1536 or external memory 1538.

The program 1540 may be stored in the memory 1530 as software, and may include, for example, an operating system (OS) 1542, middleware 1544, or an application 1546.

The input module 1550 may receive a command or data to be used by another component (e.g., the processor 1520) of the electronic device 1501, from the outside (e.g., a user) of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display module 1560 may include, for example, a display, a hologram device, or a projector and control circuitry to control a corresponding one of the display, hologram device, and projector. According to an embodiment, the display module 1560 may include a touch sensor adapted to detect a touch, or a pressure sensor adapted to measure the intensity of force incurred by the touch.

The audio module 1570 may convert a sound into an electrical signal and vice versa. According to an embodiment, the audio module 1570 may obtain the sound via the input module 1550, or output the sound via the sound output module 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, an HDMI connector, a USB connector, an SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the millimeter wave (mmWave) band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., a printed circuit board (PCB)). According to an embodiment, the antenna module 1597 may include a plurality of antennas (e.g., array antennas). In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

According to various embodiments, the antenna module 1597 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 or 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra low-latency services using, e.g., distributed computing or mobile edge computing. In another embodiment, the external electronic device 1504 may include an internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or healthcare) based on 5G communication technology or IoT-related technology.

An electronic device 1501 of FIG. 15 may be the first electronic device 1100, the second electronic device 1200, the third electronic device 1300, the fourth electronic device 1400, or the fifth electronic device 1500.

When the electronic device 1501 is the first electronic device 1100, the electronic device 1501 may perform the operations of the first electronic device 1100 in FIGS. 1 to 13.

In this case, the electronic device 1501 may receive a user input for the group call with the multiple people in the designated image 100. The electronic device 1501 may acquire the feature information of faces of the multiple people in the designated image 100, and may acquire the second contact information of the second person among the multiple people in the image, based on the acquired feature information. The electronic device 1501 may transmit the contact information of the second person and the facial feature information of the third person to a server 1508. Transmitting of the contact information of the second person and the facial feature information of the third person to the server 1508 may be requesting, from the server 1508, an identification value of a person holding the third contact information of the third person.

The electronic device 1501 may receive, from the server 2000, information indicating that the second person holds the third contact information of the third person, may initiate the group call with respect to the second electronic device 1200 of the second person by using the second contact information in response to reception of the information indicating that the second person holds the third contact information of the third person, and may transmit, to the second electronic device 1200, a request for participation of the third electronic device 1300 in the group call. The first person holding the second contact information of the second person may be identified by the server 2000 by comparing the facial feature of the second person with multiple cloud contact lists stored in the server 2000.

When the electronic device 1501 is the second electronic device 1200, the electronic device 1501 can perform the operations of the second electronic device 1200 in FIGS. 2 to 13.

In this case, the electronic device 1501 may receive a group call request from the first electronic device 1100, and initiate the group call in response to the group call request received from the first electronic device 1100. The electronic device 1501 may receive, from the first electronic device 1100, a request for participation of the third electronic device 1300 in the group call, and in response thereto, may request the third electronic device 1300 to participate in the group call.

The server 1508 of FIG. 15 may be the server 2000. In this case, the server 1508 may perform the operations of the server 2000 in FIGS. 1 to 13.

In this case, the server 1508 may receive the contact information of the second person and the facial feature information of the third person from the first electronic device 1100, may select the second cloud contact list of the second person, which is stored in the server 1508 by the second person, from among the multiple cloud contact lists stored in the server 1508, and may acquire the third contact information of the third person from the second cloud contact list stored in the server 1508 by the second person.

The server 1508 may transmit, to the first electronic device 1100, information indicating that the second person holds the third contact information of the third person.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for providing a group call service performed by a first electronic device, the method comprising:
   receiving a user input for a group call between a plurality of people included in a designated image displayed on a screen of the first electronic device;
   in response to the user input, acquiring facial features of the plurality of people in the designated image;
   based on the facial features, acquiring first contact information of a first person among the plurality of people from a first local contact list stored in the first electronic device;
   transmitting the first contact information of the first person and a facial feature of a second person among the plurality of people to a server, wherein second contact information of the second person is not included in the first local contact list;
   receiving, from the server, information indicating that the first person has the second contact information of the second person;
   in response to the receiving of the information indicating that the first person has the second contact information of the second person, initiating the group call with a second electronic device of the first person by using the first contact information; and
   transmitting, to the second electronic device, a request for participation of a third electronic device in the group call,
   wherein the first person having the second contact information of the second person is identified by the server by comparing the facial feature of the second person with a plurality of cloud contact lists stored in the server.

2. The method of claim 1, wherein the acquiring of the first contact information comprises acquiring the first contact information by comparing the facial features with person images in the first local contact list.

3. The method of claim 1, wherein the transmitting of the first contact information and the facial feature of the second person to the server comprises transmitting, to the server, a request for an identification value of a person having the second contact information among the plurality of people.

4. The method of claim 1, wherein the receiving of the information indicating that the first person has the second contact information of the second person comprises receiving, from the server, an identification value of the first person.

5. The method of claim 1, wherein the transmitting, to the second electronic device, of the request for participation of the third electronic device in the group call further comprises transmitting, to the second electronic device, the request for the participation of the third electronic device so that an indicator, which indicates that initiation of the group call or invitation to the group call is performed by a user of the first electronic device or a user of the second electronic device, is displayed on a display of the third electronic device.

6. The method of claim 1, wherein the first person having the second contact information of the second person is identified by the server by comparing the facial feature of the second person with a first cloud contact list of the first person among the plurality of cloud contact lists stored in the server.

7. The method of claim 1, wherein the acquiring of the facial features of the plurality of people in the designated image comprises, based on a user selection of selecting at least some people from among the plurality of people in the designated image, acquiring facial features of the at least some people in the designated image.

8. The method of claim 1, further comprising:
   transmitting, to the server, a facial feature of a third person among the plurality of people;
   based on third contact information of the third person being stored in a first cloud contact list, receiving, from the server, the third contact information of the third person; and
   based on the third contact information, inviting the third person to the group call.

9. The method of claim 1, further comprising:
   transmitting to the third electronic device, via the server, a request to share the second contact information of the third electronic device with the first electronic device;
   receiving, from the server, the second contact information of the third electronic device; and
   storing the second contact information and the facial feature of the second person in the first local contact list.

10. The method of claim 1, further comprising:
    based on the facial features of the plurality of people in the designated image, distinguishing partial images related to the plurality of people in the designated image;
    while the group call is in progress, displaying, on a display of the first electronic device, at least part of the designated image showing faces of participants of the group call;
    mapping objects on the at least part of the designated image and displaying the same; and
    displaying, via the objects, indicators indicating that corresponding contact information is stored in the first electronic device, that the group call is being requested, that the group call is being connected, or that speech is being produced.

11. A first electronic device for providing a group call service, the first electronic device comprising:
    at least one communication circuit configured to communicate with a server configured to store a plurality of cloud contact lists;
    a display;
    one or more processors; and
    memory storing a first local contact list and instructions that, when executed by the one or more processors, cause the first electronic device to:

receive a user input for a group call between a plurality of people included in a designated image displayed on the display;

in response to the user input, acquire facial features of the plurality of people in the designated image;

based on the facial features, acquire first contact information of a first person among the plurality of people from the first local contact list stored in the first electronic device;

transmit the first contact information of the first person and a facial feature of a second person among the plurality of people to the server, wherein second contact information of the second person is not included in the first local contact list;

receive, from the server, an identification value of the first person having the second contact information of the second person;

based on the first contact information, initiate the group call of the first person with respect to a second electronic device; and transmit, to the second electronic device, a request for participation of a third electronic device in the group call, wherein the first person having the second contact information of the second person is identified by the server by comparing the facial feature of the second person with the plurality of cloud contact lists stored in the server.

12. The first electronic device of claim 11, wherein the instructions being executable by the one or more processors, further causes the first electronic device to acquire the first contact information by comparing the facial features with person images in the first local contact list.

13. The first electronic device of claim 11, wherein the instructions being executable by the one or more processors, further causes the first electronic device to transmit, to the server, an identification value of a person having the second contact information among the plurality of people, by transmitting, to the server, the first contact information and the facial feature of the second person.

14. The first electronic device of claim 11, wherein the instructions being executable by the one or more processors, further causes the first electronic device to receive, from the server, the identification value of the first person, by receiving, from the server, information indicating that the first person has the second contact information.

15. The first electronic device of claim 11, wherein the instructions being executable by the one or more processors, further causes the first electronic device to, in case of transmitting, to the second electronic device, the request for participation of the third electronic device in the group call, provide an indication to display an indicator, which indicates that initiation of the group call or invitation to the group call is performed by a user of the first electronic device or a user of the second electronic device, on a display of the third electronic device.

16. The first electronic device of claim 11, wherein the first person having the second contact information of the second person is identified by the server by comparing the facial feature of the second person with a first cloud contact list of the first person among the plurality of cloud contact lists stored in the server.

17. The first electronic device of claim 11, wherein the instructions being executable by the one or more processors, further causes the first electronic device to, based on a user selection of selecting at least some people from among the plurality of people in the designated image, acquire facial features of the at least some people in the designated image.

18. The first electronic device of claim 11, wherein the instructions being executable by the one or more processors, further causes the first electronic device to:

transmit, to the server, a facial feature of a third person among the plurality of people;

based on third contact information of the third person being stored in a first cloud contact list, receive, from the server, the third contact information of the third person; and based on the third contact information, invite the third person to the group call.

19. The first electronic device of claim 11, wherein the instructions being executable by the one or more processors, further causes the first electronic device to:

transmit to the third electronic device, via the server, a request to share the second contact information of the third electronic device with the first electronic-device, device;

receive, from the server, the second contact information of the third electronic device; and store the second contact information and the facial feature of the second person in the first local contact list.

20. The first electronic device of claim 11, wherein the instructions being executable by the one or more processors, further causes the first electronic device to:

based on the facial features of the plurality of people in the designated image, distinguish partial images related to the plurality of people in the designated image;

while the group call is in progress, display, on the display of the first electronic device, at least part of the designated image showing faces of participants of the group call;

map objects on the at least part of the designated image and display the same; and display, on some of the objects, indicators indicating that corresponding contact information is stored in the first electronic device, that the group call is being requested, that the group call is being connected, or that speech is being produced.

* * * * *